(12) United States Patent
Schroeder et al.

(10) Patent No.: US 11,362,562 B2
(45) Date of Patent: Jun. 14, 2022

(54) AXIAL ANTI-BACKLASH STEPPER/SERVO MOTOR

(71) Applicants: Robert Schroeder, Fernandina Beach, FL (US); Jonathan R. Schroeder, South Beloit, IL (US); Timothy Joseph LeCrone, Rockford, IL (US); Kent Proffitt, Belvidere, IL (US); Kollin Proffitt, Belvidere, IL (US); Keith Cummings, Rockford, IL (US)

(72) Inventors: Robert Schroeder, Fernandina Beach, FL (US); Jonathan R. Schroeder, South Beloit, IL (US); Timothy Joseph LeCrone, Rockford, IL (US); Kent Proffitt, Belvidere, IL (US); Kollin Proffitt, Belvidere, IL (US); Keith Cummings, Rockford, IL (US)

(73) Assignee: Pacific Bearing Corp., Rockford, IL (US)

(*) Notice: Subject to any disclaimer, the term of this patent is extended or adjusted under 35 U.S.C. 154(b) by 0 days.

(21) Appl. No.: 17/499,392

(22) Filed: Oct. 12, 2021

(65) Prior Publication Data

US 2022/0060079 A1    Feb. 24, 2022

Related U.S. Application Data

(63) Continuation of application No. PCT/US2020/027505, filed on Apr. 9, 2020.
(Continued)

(51) Int. Cl.
*H02K 5/173* (2006.01)
*H02K 7/08* (2006.01)
(Continued)

(52) U.S. Cl.
CPC .......... *H02K 5/1732* (2013.01); *F16H 25/24* (2013.01); *H02K 7/06* (2013.01); *H02K 7/083* (2013.01);
(Continued)

(58) Field of Classification Search
CPC .......... H02K 5/173; H02K 7/08; H02K 15/02; H02K 15/14
(Continued)

(56) References Cited

U.S. PATENT DOCUMENTS 3,082,338 A * 3/1963 Turk ...................... H02K 7/083
                                                    310/90
3,694,906 A * 10/1972 Rank ...................... H02K 17/16
                                                    29/598

(Continued)

FOREIGN PATENT DOCUMENTS

CN          206533232 U       9/2017

*Primary Examiner* — Jose A Gonzalez Quinones
(74) *Attorney, Agent, or Firm* — Reinhart Boerner Van Deuren P.C.

(57) ABSTRACT

A motor is provided. The motor includes a motor body and a rotor assembly. The rotor assembly includes a magnetic core mounted to a rotor shaft. The rotor assembly may include standoffs for accurately axially locating the magnetic core relative to rotor bearings. A drive nut adjustment arrangement may be provided. A mechanical interconnection between the drive nut and rotor shaft may be provided. A trailing end lead screw support may be provided. An axial preload arrangement may be provided to axially locate the rotor assembly within the motor body.

23 Claims, 21 Drawing Sheets

Related U.S. Application Data

(60) Provisional application No. 62/833,375, filed on Apr. 12, 2019.

(51) Int. Cl.
*H02K 7/06* (2006.01)
*H02K 15/02* (2006.01)
*H02K 15/14* (2006.01)
*F16H 25/24* (2006.01)
*F16H 25/20* (2006.01)

(52) U.S. Cl.
CPC ............ *H02K 15/02* (2013.01); *H02K 15/14* (2013.01); *F16H 2025/2075* (2013.01); *F16H 2025/2436* (2013.01)

(58) Field of Classification Search
USPC .............................. 310/90, 216.116, 216.121
See application file for complete search history.

(56) References Cited

U.S. PATENT DOCUMENTS

| | | | | |
|---|---|---|---|---|
| 5,091,668 A | * | 2/1992 | Cuenot | ................ H02K 1/2773 310/410 |
| 8,174,162 B2 | * | 5/2012 | Jun | .......................... H02K 1/30 68/140 |
| 2007/0295128 A1 | | 12/2007 | Erikson et al. | |
| 2008/0115605 A1 | | 5/2008 | Erikson et al. | |
| 2008/0163712 A1 | | 7/2008 | Oberle et al. | |
| 2013/0160585 A1 | | 6/2013 | Schroeder et al. | |
| 2015/0300466 A1 | | 10/2015 | Kahnert | |

\* cited by examiner

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| PENTAGON | 0.001 | 0.405 | 0.81 |
| | 0.002 | 0.818 | 1.636 |
| | 0.003 | 1.239 | 2.478 |
| | 0.004 | 1.669 | 3.338 |
| | 0.005 | 2.109 | 4.218 |
| | 0.006 | 2.559 | 5.118 |
| | 0.007 | 3.018 | 6.036 |
| | 0.008 | 3.489 | 6.978 |
| | 0.009 | 3.971 | 7.942 |
| | 0.01 | 4.464 | 8.928 |

FIG. 25

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| TRIANGLE | 0.001 | 0.283 | 0.566 |
| | 0.002 | 0.571 | 1.142 |
| | 0.003 | 0.866 | 1.732 |
| | 0.004 | 1.167 | 2.334 |
| | 0.005 | 1.473 | 2.946 |
| | 0.006 | 1.787 | 3.574 |
| | 0.007 | 2.107 | 4.214 |
| | 0.008 | 2.434 | 4.868 |
| | 0.009 | 2.768 | 5.536 |
| | 0.01 | 3.11 | 6.22 |

FIG. 26

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| D SHAPE | 0.001 | 0.41 | 0.82 |
| | 0.002 | 0.827 | 1.654 |
| | 0.003 | 1.25 | 2.5 |
| | 0.004 | 1.68 | 3.36 |
| | 0.005 | 2.117 | 4.234 |
| | 0.006 | 2.561 | 5.122 |
| | 0.007 | 3.012 | 6.024 |
| | 0.008 | 3.471 | 6.942 |
| | 0.009 | 3.938 | 7.876 |
| | 0.01 | 4.414 | 8.828 |

FIG. 27

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| KEYWAY | 0.001 | 0.244 | 0.488 |
| | 0.002 | 0.489 | 0.978 |
| | 0.003 | 0.738 | 1.476 |
| | 0.004 | 0.988 | 1.976 |
| | 0.005 | 1.241 | 2.482 |
| | 0.006 | 1.495 | 2.99 |
| | 0.007 | 1.753 | 3.506 |
| | 0.008 | 2.012 | 4.024 |
| | 0.009 | 2.274 | 4.548 |
| | 0.01 | 2.538 | 5.076 |

FIG. 28

| CONTROLLING FIT OF MATING PARTS ||||
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| SPLINE | 0.001 | 0.266 | 0.532 |
| | 0.002 | 0.534 | 1.068 |
| | 0.003 | 0.805 | 1.61 |
| | 0.004 | 1.079 | 2.158 |
| | 0.005 | 1.355 | 2.71 |
| | 0.006 | 1.634 | 3.268 |
| | 0.007 | 1.916 | 3.832 |
| | 0.008 | 2.2 | 4.4 |
| | 0.009 | 2.487 | 4.974 |
| | 0.01 | 2.777 | 5.554 |

FIG. 29

| CONTROLLING FIT OF MATING PARTS ||||
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| KNURL | 0.001 | 0.324 | 0.648 |
| | 0.002 | 0.656 | 1.312 |
| | 0.003 | 0.997 | 1.994 |
| | 0.004 | 1.346 | 2.692 |
| | 0.005 | 1.705 | 3.41 |
| | 0.006 | 2.073 | 4.146 |
| | 0.007 | DISENGAGED | #VALUE! |
| | 0.008 | DISENGAGED | #VALUE! |
| | 0.009 | DISENGAGED | #VALUE! |
| | 0.01 | DISENGAGED | #VALUE! |

FIG. 30

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| HEPTAGON | 0.001 | 0.614 | 1.228 |
|  | 0.002 | 1.25 | 2.5 |
|  | 0.003 | 1.908 | 3.816 |
|  | 0.004 | 2.59 | 5.18 |
|  | 0.005 | 3.3 | 6.6 |
|  | 0.006 | 4.039 | 8.078 |
|  | 0.007 | 4.812 | 9.624 |
|  | 0.008 | 5.621 | 11.242 |
|  | 0.009 | 6.472 | 12.944 |
|  | 0.01 | 7.371 | 14.742 |

FIG. 31

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| DOUBLE HEX | 0.001 | 0.511 | 1.022 |
|  | 0.002 | 1.035 | 2.07 |
|  | 0.003 | 1.573 | 3.146 |
|  | 0.004 | 2.127 | 4.254 |
|  | 0.005 | 2.697 | 5.394 |
|  | 0.006 | 3.285 | 6.57 |
|  | 0.007 | 3.891 | 7.782 |
|  | 0.008 | 4.517 | 9.034 |
|  | 0.009 | 5.164 | 10.328 |
|  | 0.01 | 5.836 | 11.672 |

FIG. 32

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| DOUBLE D | 0.001 | 0.374 | 0.748 |
| | 0.002 | 0.753 | 1.506 |
| | 0.003 | 1.137 | 2.274 |
| | 0.004 | 1.526 | 3.052 |
| | 0.005 | 1.921 | 3.842 |
| | 0.006 | 2.321 | 4.642 |
| | 0.007 | 2.726 | 5.452 |
| | 0.008 | 3.138 | 6.276 |
| | 0.009 | 3.555 | 7.11 |
| | 0.01 | 3.978 | 7.956 |

*FIG. 33*

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| INVOLUTE | 0.001 | 0.271 | 0.542 |
| | 0.002 | 0.542 | 1.084 |
| | 0.003 | 0.814 | 1.628 |
| | 0.004 | 1.085 | 2.17 |
| | 0.005 | 1.356 | 2.712 |
| | 0.006 | 1.627 | 3.254 |
| | 0.007 | 1.898 | 3.796 |
| | 0.008 | 2.169 | 4.338 |
| | 0.009 | 2.44 | 4.88 |
| | 0.01 | 2.714 | 5.424 |

*FIG. 34*

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| DOUBLE SQUARE | 0.001 | 0.346 | 0.692 |
| | 0.002 | 0.697 | 1.394 |
| | 0.003 | 1.056 | 2.112 |
| | 0.004 | 1.421 | 2.842 |
| | 0.005 | 1.793 | 3.586 |
| | 0.006 | 2.173 | 4.346 |
| | 0.007 | 2.56 | 5.12 |
| | 0.008 | 2.954 | 5.908 |
| | 0.009 | 3.357 | 6.714 |
| | 0.01 | 3.769 | 7.538 |

*FIG. 35*

| CONTROLLING FIT OF MATING PARTS | | | |
|---|---|---|---|
| NET SHAPE | GAP BETWEEN ROTOR AND NUT | HALF ANGLE OF TRAVEL (DEGREES) | TOTAL ANGLE OF TRAVEL (DEGREES) |
| OCTAGON | 0.001 | 0.717 | 1.434 |
| | 0.002 | 1.465 | 2.93 |
| | 0.003 | 2.248 | 4.496 |
| | 0.004 | 3.069 | 6.138 |
| | 0.005 | 3.934 | 7.868 |
| | 0.006 | 4.85 | 9.7 |
| | 0.007 | 5.824 | 11.648 |
| | 0.008 | 6.869 | 13.738 |
| | 0.009 | 7.999 | 15.998 |
| | 0.01 | 9.236 | 18.472 |

*FIG. 36*

AXIAL ANTI-BACKLASH STEPPER/SERVO MOTOR

This patent application is a continuation of U.S. PCT Patent Application No. PCT/US2020/027505, filed Apr. 9, 2020, which claims the benefit of U.S. Provisional Patent Application No. 62/833,375, filed Apr. 12, 2019, the entire teachings and disclosure of which are incorporated herein by reference thereto.

FIELD OF THE INVENTION

This invention generally relates to motors and particularly stepper/servo motors.

BACKGROUND OF THE INVENTION

Linear actuators that utilize stepper/servo motors are often used in highly precision systems where highly precise linear motion is desired. However, by nature, stepper motors are not design for axial loads. Therefore, axial backlash and accuracy are not typically addressed.

Unfortunately, backlash in the system can reduce accuracy of the position of the object being driven by the motor.

One problem associated with these types of motors relates to the assembly method that relies on adhesive and a press fit to maintain the rotor position within the body. The press fit is used to locate the magnetic core on the rotor shaft. Unfortunately, imprecise gaps are created between the bearings that support the rotor shaft and the magnetic core on the rotor shaft. Thus, when the assembly of components is mounted within the motor body, backlash can occur between the rotor and the magnetic stator as a result of an imprecise assembly process. More particularly, the components of the rotor are not consistently and accurately aligned with one another resulting in imprecise and improper alignment of the magnetic core of the rotor assembly and the magnetic stator.

Another problem with current designs is that a variable-force wave spring is used to axially secure the rotor assembly within the motor body and to allow for compensating for expansion of the components, e.g. due to thermal expansion. Unfortunately, as determined by the instant inventors, this allows for a wide variation of movement in the system and contributes to backlash. Also, during assembly, due to the use of a variable force spring, the inventors have identified that assemblers will often over tighten the assembly such that the wave spring becomes fully compressed and thus overloads the bearings in the axial direction resulting in premature wear of the bearings and increase resistance on the motor reducing the overall output force of the motor.

A third source of backlash occurs at the lead end of drive nut, where insufficient contact between the threads of the nut and the threads of the lead screw may occur. This is particularly true as the drive nut wears with use. Insufficient contact allows for backlash in the system as the drive nut will have a degree of rotation when changing direction where the drive nut is not engaging the threads of the lead screw.

A fourth source of backlash is lag stemming from the fit between rotor and drive nut. As the pocket of the rotor and cooperating interface of the drive nut (often referred to as a boss) diverge from a line fit, the angular displacement increases, which is undesirable.

Additionally, as the screw exits the leading end of a hollow-shaft motor, the drive nut helps to stabilize whipping of the screw due to gravity and other forces. However, on the trailing end, e.g. the end opposite the nut, the lead screw is not radially supported. The subsequent whipping action of the screw that is transverse to the rotational axis of the rotor is a factor of additional backlash.

A related issue is if the motor and/lead screw are not properly aligned in the end system, this can put transverse loads on the lead screw. These transverse loads can cause slight deflection of the components of the nut such that the lead screw is not perfectly aligned with the rotational axis of the rotor shaft through which the lead screw extends. This offset/angled orientation can result in the outer periphery of the non-rotating lead screw contacting the inner periphery of the rotating rotor shaft. This interaction can damage the threads of the lead screw.

These and other advantages of the invention, as well as additional inventive features, will be apparent from the description of the invention provided herein.

BRIEF SUMMARY OF THE INVENTION

Embodiments of the invention provide improvements over the current state of the art as it relates to motors and particularly stepper and servo motors. Even more particularly, some embodiments are directed at reducing backlash within the system such that improved control and positioning may be provided.

In a particular embodiment, a rotor assembly for a motor is provided. The rotor assembly includes a rotor shaft, first and second bearings, a magnetic core, first and second standoffs and a shaft retainer. The rotor shaft defines a rotor shaft axis. The rotor shaft provides a first axial abutment. The first and second bearings are radially support the rotor shaft. An outboard side of the first bearing axially abuts the first axial abutment. The magnetic core has a first end and a second end mounted between the first and second bearings. The first standoff axially abuts an inboard side of the first bearing and axially abuts the first end of the magnetic core. The second standoff axially abuts an inboard side of the second bearing and the second of the magnetic core. The shaft retainer attaches to the rotor shaft and axially abuts the outboard side of the second bearing.

In an embodiment, the shaft retainer is threadedly attached to threading provided on an outer surface of the rotor shaft. The shaft retainer is thus axially movable along the shaft parallel to the shaft axis via the threaded engagement.

In an embodiment, the first and second bearings have radially inner and outer races. The first standoff axially abuts the inner race of the first bearing. The second standoff axially abuts the inner race of the second bearing. The inner race of the first bearing axially abuts the first axial abutment. The shaft retainer axially abuts the inner race of the second bearing. In a preferred embodiment all of these components are formed from metal to provide metal-on-metal contact at the abutting interfaces therebetween.

In one implementation, a motor is provided. The motor includes a rotor assembly, such as provided above, a motor body, and a rotor assembly retainer. The rotor assembly is mounted within the motor body. The first and second bearings radially supporting the rotor assembly within the motor body. The motor body provides a first motor body axial abutment. The outboard side of the first bearing axially abuts the first motor body axial abutment. The rotor assembly retainer axially abuts the outboard side of the second bearing and engages the motor body.

The motor body provides a stator with which the magnetic core of the rotor assembly cooperates. An axially stacked relationship between the motor body, bearings, standoffs, magnetic core, rotor assembly retainer and shaft retainer, properly orient the magnetic core relative to the stator when fully assembled.

In an embodiment, the first and second bearings have inner and outer races. The first standoff axially abuts the inner race of the first bearing. The second standoff axially abuts the inner race of the second bearing. The inner race of the first bearing axially abuts the first axial abutment. The shaft retainer axially abuts the inner race of the second bearing. The outer race of the first bearing axially abuts the first motor body axial abutment. The rotor assembly retainer axially abuts the outer race of the second bearing.

In an embodiment, the rotor assembly retainer is threadedly secured to the motor body for axially threading the rotor assembly retainer along the rotor shaft axis.

In an embodiment, the rotor assembly retainer is provided by a threaded retainer and a preload member. The preload member is positioned axially between and in axial abutment with the outer race of the second bearing and the threaded retainer. The threaded retainer is threadedly secured to the motor body.

In an embodiment, the shaft retainer is threadedly attached to threading provided on an outer surface of the rotor shaft.

In an embodiment, the preload member is a polymer disc.

In another embodiment, a method of assembling motors outlined herein is provided. The method includes axially stacking the first bearing, first standoff, magnetic core, second standoff and second bearing on the rotor shaft along the rotor shaft axis against the first axial abutment provided by the rotor shaft. The method includes securing the first bearing, first standoff, magnetic core, second standoff and second bearing on the rotor shaft with the shaft retainer. The method includes inserting the first bearing, first standoff, magnetic core, second standoff, second bearing, rotor shaft and shaft retainer into the motor body with the magnetic core positioned within a magnetic stator and the first bearing axially in axial abutment with the first motor body axial abutment.

In one embodiment, the method includes attaching the rotor assembly retainer to the motor body and axially abutting the rotor assembly retainer against the outboard side of the second bearing.

In one embodiment, attaching the rotor assembly retainer to the motor body includes threading the rotor assembly retainer to corresponding threading of the motor body.

In one embodiment, securing the first bearing, first standoff, magnetic core, second standoff and second bearing on the rotor shaft with the shaft retainer includes threadedly securing the shaft retainer to the rotor shaft along the rotor shaft axis.

In one embodiment, the step of stacking includes press fitting the magnetic core to the rotor shaft such that the magnetic core and rotor shaft are angularly fixed to one another about the rotor shaft axis due to friction. Alternatively, some mechanical angular engagement may be provided, e.g. knurling, keying etc.

In one embodiment, the method includes adhesively securing the magnetic core to the rotor shaft. This may be done with or without press fit engagement.

In another embodiment, a motor is provided that includes a motor body, a rotor assembly, and a rotor assembly retainer. The rotor assembly includes a rotor shaft defining a rotor shaft axis, a magnetic core, and a first bearing. The rotor assembly retainer includes a retainer member and a preload member. The preload member is axially positioned between an outboard side of the first bearing and the retainer member. The preload member is a disc having a Shore-A durometer value of between 10 and 80.

In an embodiment, the disc has a constant cross-sectional configuration at all angular positions about the rotor shaft axis. Thus, the disc is free of recesses and projections in the axial direction, unlike a wave or coil spring.

In one embodiment, the preload member is a polymer disc.

In one embodiment, the retainer member is threadedly engaged with the motor body for axial adjustment along the rotor shaft axis to adjust the axial force applied to the first bearing through the preload member.

In one embodiment, the first bearing has radial inner and outer races. The preload member axially abuts the outboard side of the outer race.

In another embodiment, a motor is provided that includes a motor body, a rotor assembly, and a rotor assembly retainer. The rotor assembly includes a rotor shaft defining a rotor shaft axis, a magnetic core, and a first bearing. The rotor assembly retainer includes a retainer member and a preload member. The preload member is axially positioned between an outboard side of the first bearing and the retainer member. The preload member is a polymer disc axially positioned between an outboard side of the first bearing and the retainer member.

In one embodiment, the retainer member is threadedly engaged with the motor body for axial adjustment along the rotor shaft axis to adjust the axial force applied to the first bearing through the preload member.

In one embodiment, the first bearing has radial inner and outer races. The preload member axially abuts the outboard side of the outer race.

In one embodiment, the disc has a constant cross-sectional configuration at all angular positions about the rotor shaft axis. Thus, the disc is free of recesses and projections in the axial direction.

In another embodiment, a motor including a motor body, a rotor assembly, a drive nut and a compression arrangement is provided. The rotor assembly is rotatably carried in the motor body. The rotor assembly includes a rotor shaft that defines a rotor shaft axis. The drive nut is configured to engage a lead screw. The drive nut is angularly fixed to the rotor assembly such that rotation of the rotor assembly rotationally drives the drive nut about the rotor shaft axis. The drive nut includes a plurality of flexible fingers that have threads on an interior thereof for engaging the lead screw. The compression arrangement radially compresses the flexible fingers towards the rotor shaft axis. The compression arrangement includes a radial compression member. The compression arrangement includes a conically tapered interface between the plurality of flexible fingers and radial compression member. The tapered interface includes a first tapered surface provided by the plurality of flexible fingers or the radial compression member and a contact zone provided by the other one of the plurality of flexible fingers or radial compression member. As the radial compression member is axially translated along the rotor shaft, the contact zone slides along the tapered surface which causes the flexible fingers to be deflected radially inward toward the rotor shaft axis.

In one embodiment, the rotor shaft includes an internal cavity. The drive nut and compression member are positioned within the rotor shaft.

In one embodiment, the tapered surface of the tapered interface is provided by a portion of the radial compression member. The radial compression member has a base portion from which the tapered surface extends. The base portion is positioned axially offset from a distal end of the flexible fingers. In one embodiment, the base portion is a cylindrical portion of the radial compression member.

In one embodiment, the motor includes an adjustment member threadedly carried for threaded motion along the rotor shaft axis. The adjustment member acts on the compression member to translate the contact zone along the tapered surface to deflect the flexible fingers radially inward as the adjustment member is threaded along the rotor shaft axis.

In one embodiment, the adjustment member is threadedly attached to a carrier member. The carrier member attached to the rotor shaft.

In one embodiment, the rotor shaft includes an internal cavity and the drive nut and compression member are positioned within the rotor shaft.

In one embodiment, the contact zone is provided by a second tapered surface that cooperates with the first tapered surface. These two surfaces need not have the identical angle relative to the rotor shaft axis.

In one embodiment, the carrier member is threadedly attached to the rotor shaft.

In one embodiment, the motor includes a sleeve located radially between an outer periphery of the drive nut and an inner periphery of the rotor shaft defining the internal cavity. The flexible fingers of the drive nut and the radial compression member are located within the sleeve.

In one embodiment, the radial compression member includes an axially extending annular flange extending axially away from the conically tapered interface, the adjustment member including a free end received axially within the annular flange.

In another embodiment, a motor including a rotor assembly and a drive nut is provided. The rotor assembly is carried rotatably in the motor body. The rotor assembly includes a rotor shaft that defines a rotor shaft axis. The drive nut is configured to engage a lead screw. The drive nut is mechanically angularly fixed to the rotor assembly such that angular rotation between the drive nut and rotor shaft is prevented such that rotation of the rotor assembly rotationally drives the drive nut. The drive nut includes a plurality of flexible fingers having threads on an interior thereof for engaging the lead screw.

In one embodiment, the drive nut includes a base from which the flexible fingers axially extend. The base has a non-round outer periphery. The rotor shaft has an internal cavity in which, at least, the base of the drive nut is axially inserted. An inner surface of the rotor shaft defining the internal cavity has a non-round inner periphery that matches and angularly engages the non-round outer periphery of the base to prevent relative angular displacement between the drive nut and the rotor shaft.

In one embodiment, a coupling pin is provided to mechanically angularly fix the two components. The drive nut includes an axially extending recess. The rotor shaft including an axially extending recess. The coupling pin extends axially into the axially extending recess of the drive nut and axially into the axially extending recess of the rotor shaft to prevent angular rotation between the drive nut and the rotor shaft. Typically, the recesses and pin extend axially parallel to the rotor shaft axis.

In one embodiment, a coupling pin is provided. The drive nut includes a recess. The rotor shaft defines an internal cavity defined by an annular sidewall of the rotor shaft. The drive nut is located within the internal cavity. The rotor shaft includes a radially extending aperture extending through the sidewall. The coupling pin extends radially into the recess of the drive nut and radially into the radially extending aperture in the sidewall of the rotor shaft to prevent angular rotation between the drive nut and the rotor shaft.

In one embodiment, the coupling pin includes a tapered head that increases in diameter when moving radially outward and away from the rotor shaft axis. The aperture in the sidewall has a mating tapered profile receiving the tapered head of the coupling pin such that the coupling pin is fully radially recessed relative to a radial outer periphery of the sidewall of the rotor shaft.

In one embodiment, the drive nut includes first threading having a first orientation. The rotor shaft has a second threading having the first orientation for threadedly engaging the first threading of the drive nut to axially secure the drive nut to the rotor shaft. The rotor shaft has a third threading having a second orientation angularly opposite the first orientation. A drive nut retainer has fourth threading having the second orientation for threadedly engaging the third threading of the rotor shaft. The drive nut retainer axially abutting the drive nut. As such, the first and second threading provides a first threaded interface and the third and fourth threading provides a second threaded interface. The first and second threaded interfaces are oriented opposite one another (e.g. one is left handed while the other is right handed).

In one embodiment, the drive nut includes first and second axially facing abutments. The first and second axially facing abutments face axially away from one another. The rotor shaft has a third axially facing abutment that axially abuts the first axially facing abutment. The drive nut retainer has a fourth axially facing abutment that axially abuts the second axially facing abutment.

In one embodiment, the drive nut includes a radially extending abutment flange that defines the first and second axially facing abutments. The radially extending abutment flange is axially sandwiched between the drive nut retainer and the rotor shaft.

In one embodiment, each of the non-round inner and outer peripheries include at least one flat surface.

In an embodiment, a method of assembling a motor as outlined herein is provided. The method includes threadedly attaching the drive nut to the rotor shaft by rotating the drive nut relative to the rotor shaft in a first angular direction to threadedly engage the first and second threading. The method includes threadedly attaching the drive nut retainer to the rotor shaft by rotating the drive nut retainer relative to the rotor shaft in a second angular direction opposite the first angular direction to threadedly engage the third and fourth threading.

In one embodiment, the threading of the drive nut relative to the rotor shaft occurs until the first and third axially facing abutments abut. The threading of the drive nut retainer relative to the rotor shaft occurs until the second and fourth axially facing abutments abut.

In another embodiment, a motor including a rotor assembly, a lead screw, a drive nut and a lead screw support is provided. The rotor assembly is rotatably carried in the motor body. The rotor assembly includes a rotor shaft that defines a rotor shaft axis. The lead screw extends through the rotor shaft along the rotor shaft axis. The drive nut is configured to engage the lead screw proximate a first end of the rotor shaft. The lead screw support is proximate a second end of the rotor shaft. The lead screw support provides radial support to the lead screw when a portion of the lead screw extends axially outward of the rotor shaft beyond the second end of the rotor shaft.

The lead screw support, in an embodiment, does not threadedly engage the threads of the lead screw.

In an embodiment, the lead screw support includes a central aperture through which the lead screw extends when the portion of the lead screw extends outward beyond the second end of the rotor shaft.

In an embodiment, the lead screw support is threadedly attached to the rotor shaft proximate the second end of the rotor shaft.

In an embodiment, the lead screw support is formed from a material that is softer than the material of the rotor shaft.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 25-36 provide the data for the chart of FIG. 24;

FIG. 25 provides the data for the pentagon fit;

FIG. 26 provides the data for the triangle fit;

FIG. 27 provides the data for the D-shape fit;

FIG. 28 provides the data for the keyway fit;

FIG. 29 provides the data for the spline fit;

FIG. 30 provides the data for the knurled fit;

FIG. 31 provides the data for the heptagon fit;

FIG. 32 provides the data for the hexagon fit;

FIG. 33 provides the data for the boule D fit;

FIG. 34 provides the data for the involute fit;

FIG. 35 provides the data for the double square fit;

FIG. 36 provides the data for the octagon fit;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
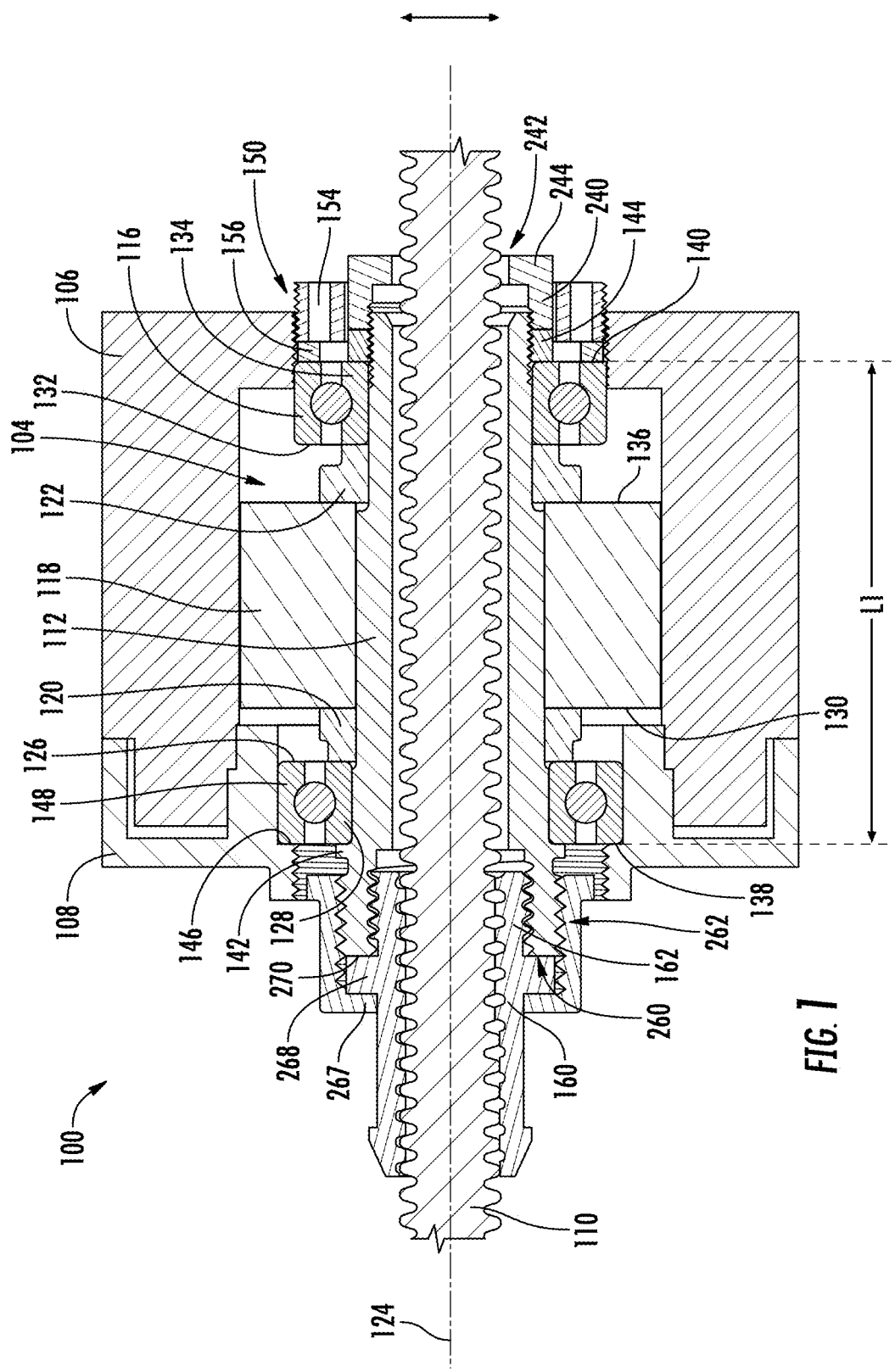
FIG. 1 is a simplified cross-sectional illustration of a motor.

FIG. 1 is a cross-sectional illustration of a motor 100. The motor 100 includes a motor body 102 and a rotor assembly 104 located within the motor body 102. The motor body includes a stator 106 and a cover member 108 which may also be referred to herein as an end bell 108. The rotor assembly 104 is operably coupled to an externally threaded screw 110 (e.g. a lead screw) to drive the screw 110.

The rotor assembly 104 includes a rotor shaft 112, first and second bearings 114, 116, a magnetic core 118, and first and second axial standoffs 120, 122.

When mounted within the motor body 102, bearings 114, 116 radially support the rotor shaft 112 for rotation about a rotor shaft axis 124. The magnetic core 118 is operably angularly secured to the rotor shaft 112 such that rotational forces generated between the magnetic core 118 and the stator 106 cause the rotor shaft 112 to rotate. This angular securement may occur by way of a press fit or an adhesive between the rotor shaft 112 and the magnetic core 118.

To properly axially position the magnetic core 118, the first and second bearings 114, 116, first and second axial standoffs 120, 122 and magnetic core 118 are axially stacked. More particularly, the first standoff 120 is in axial abutment with an inboard side 126 of the first bearing 114, and particularly an inboard side of a radially inner race 128 of the first bearing 114. Additionally, the first standoff 120 is in axial abutment with a first end 130 of the magnetic core 118. In this configuration, the magnetic core 118 is positioned axially between the first and second bearings 114, 116.

Similarly, the second standoff 122 is in axial abutment with an inboard side 132 of the second bearing 116, and particularly an inboard side of a radially inner race 134 of the second bearing 116. Additionally, the second standoff 122 is in axial abutment with a second end 136 of the magnetic core 118 that is opposite of and faces axially away from the first end 130.

As such, the axial length L1 from an outboard side 138 of the first bearing 114 and an outboard side 140 of the second bearing 116 remains highly accurate during assembly of the rotor assembly 104. As such, when the motor is mass produced, the dimension remains constant from one motor to the next. To further promote accuracy and consistency, in an embodiment, the standoffs 120, 122 are formed from metal as are the inner races 128, 134 of the bearings 114, 116.

In particular, the axial spacing between the bearings and the magnetic core 118 is highly consistent such that when the rotor assembly 104 is mounted within the motor body 102, and particularly the stator 106, the magnetic core 118 is properly axially aligned with the stator 106. Proper axial alignment of the magnetic core 118 with the stator 106 reduces potential backlash between the magnetic core 118 and the stator 106 during assembly.

In the illustrated embodiment, the rotor shaft 110 includes a first axial abutment 142. During assembly, the outboard side 138 of the first bearing 114 is axially abutted against an inboard side of the first axial abutment 142 to locate the stack of the first and second bearings 114, 116, the first and second standoffs 120, 122 and the magnetic core 118. This precisely locates these components along rotor shaft axis 124.

In this embodiment, the outboard side of the inner race 128 of the first bearing 114 axially abuts first axial abutment 142.

To secure the stack of components at the desired axial location along the rotor shaft axis 124, a shaft retainer 144 is attached to the rotor shaft 112 and axially abuts an outboard side 140 of the second bearing 116. In this embodiment, the shaft retainer 144 axially abuts an outboard side of the inner race 134 of second bearing 116.

In a preferred embodiment, the shaft retainer 144 is attached threadedly to the rotor shaft 112. More particularly, the outer peripheral surface of the rotor shaft 112 includes threading that cooperates with inner threading of the shaft retainer 144.

During assembly, once the first and second bearings 114, 116, magnetic core 118 and first and second standoffs 120, 122 have been mounted to the rotor shaft 112, the shaft retainer 144 is attached to the rotor shaft 112. Thus, these components are axially captured between inboard sides of the first axial abutment 142 and the shaft retainer 144.

It is noted that the axial alignment and stacking of the components operates through the inner races 128, 134.

During some assembly processes, the shaft retainer 144 will be attached to the rotor shaft 112 prior to insertion of the rotor assembly 104 into the motor body 102.

To axially locate the rotor assembly 104 properly, and particularly the magnetic core 118, within the stator 106, the motor body 102 provides a first motor body axial abutment 146. The outboard side 140 of the first bearing 114, and particularly, an outboard side of the outer race 148 of the first bearing 114 is axially abutted against an inboard side of the first motor body axial abutment 146. In this embodiment, the first motor body axial abutment 146 is provided by end bell 108.

A rotor assembly retainer 150 axially abuts the outboard side 140 of the second bearing 116 and engages the motor body 102 to axially secure the rotor assembly 104 within the motor body 102. In a preferred embodiment and as illustrated, the rotor assembly retainer 150 axially abuts an outboard side of the outer race 152 of the second bearing 116.

The inner and outer races of the bearings support roller elements such as balls or rollers therebetween. The bearings may take the form of tapered roller bearings, single-row angular contact bearings, deep-groove bearings, and/or double-row angular contact bearings.

In a preferred embodiment, the rotor assembly retainer 150 threadedly engages the motor body 102. This allows for axially threading the rotor assembly retainer 150 along the rotor shaft axis 124 for securing the rotor assembly 104 within the motor body 102.

Additionally, in the illustrated embodiment, the rotor assembly retainer 150 is an assembly of components. The rotor assembly retainer 150 includes a threaded retainer 154 and a preload member 156. The preload member 156 is positioned axially between the second bearing 116 and the threaded retainer 154. The preload member 156 in the illustrated embodiment is directly abutting an outboard side of the second bearing 116 and an inboard side of the threaded retainer 154.

The preload member 156, in a preferred embodiment, is a polymer disc. The preload member allows for proper axial loading during assembly but also allows for shock absorption as well as thermal expansion of the rotor assembly 104 during use.

Depending on the environment of use, the durometer of the preload member 156 is preferably between a Shore-A hardness of 10 and 80.

The use of a threaded retainer 154 allows for fine adjustment of the axial force applied to the rotor assembly 104 through the preload member 156 when securing the rotor assembly 104 within the motor body 102. Again, this arrangement can reduce backlash in the motor 100 to provide improved accuracy and motion control of the system.

A further source of backlash relates between the interface between the rotor shaft 112 and the screw 110.

Figure 2:
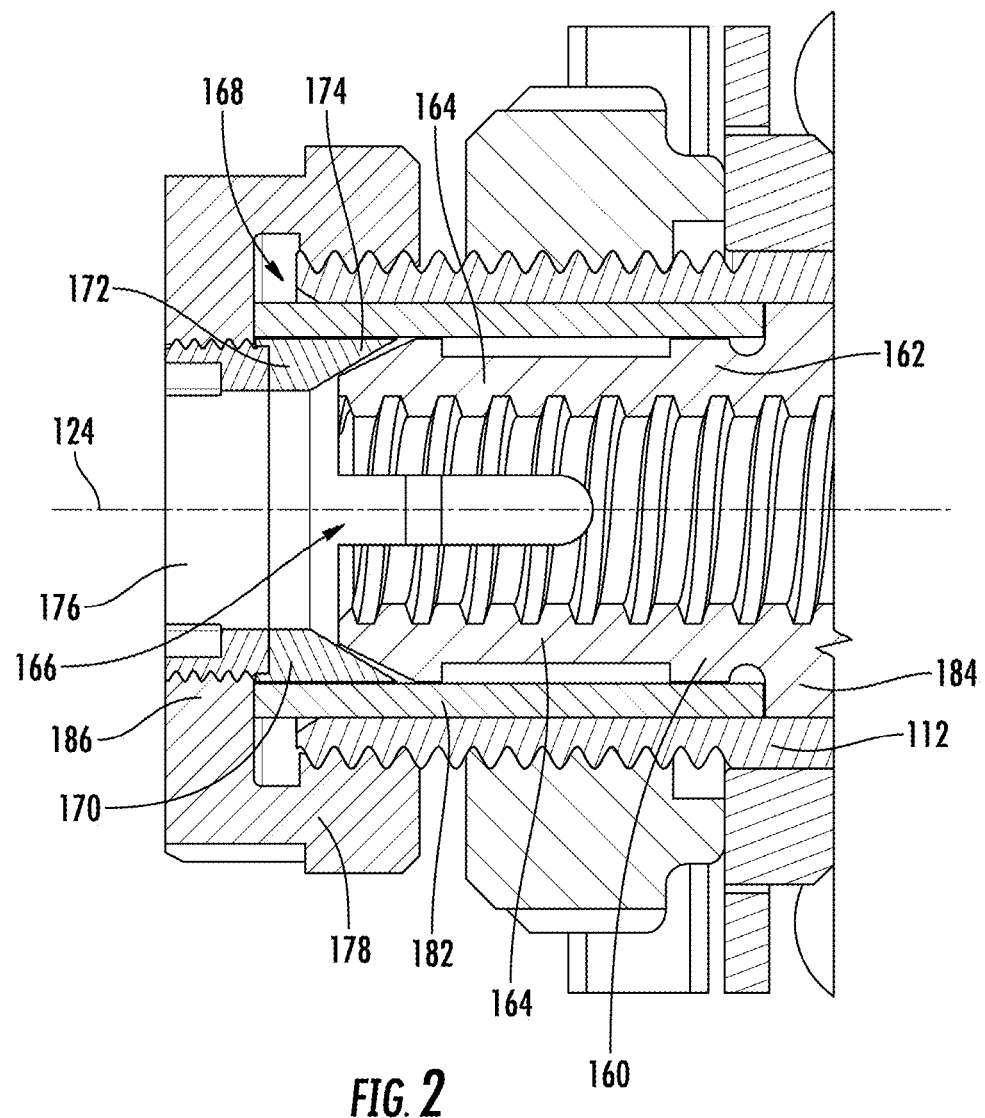
FIG. 2 is a partial cross-sectional illustration of a drive nut for connecting the motor to a lead screw.

FIG. 2 illustrates a further feature of the invention. In this embodiment, a drive nut 160 is provided for connecting the rotor shaft 112. The drive nut 160 will engage the screw 110 such that the screw 110 can be operably driven. The drive nut 160 is internally threaded for engaging cooperating threads of the screw 110.

Insufficient contact between the threads of the drive nut 160 and the screw 110 is a further source of backlash.

The drive nut 160 is angularly fixed to the rotor shaft 112 such that rotation of the rotor shaft 112 about axis 124 is transferred to rotation of the drive nut 160.

The drive nut 160 includes a base region 162 from which a plurality of flexibly fingers 164 extend in an axial orientation. At least a portion of the flexible fingers are internally threaded. Grooves 166 are angularly interposed between adjacent fingers 164.

A compression arrangement 168 allows for radially compressing the flexible fingers 164 towards the rotor shaft axis 124. The compression arrangement 168 includes a tapered interface between a compression member 170 and free ends of the fingers 164. The tapered interface converts axial motion of the compression member 170 into a radial load being applied to the flexible fingers 164. The tapered interface includes a tapered surface provided by the compression member 170 and/or flexible fingers 164. A contact zone of the other one of the components will engage the tapered surface when moved axially along axis 124, e.g. to the right of the page in FIG. 2, creating a radially directed force on the flexible fingers 164 causing the flexible fingers 164 to be biased and deflected radially inward.

In this embodiment, the compression member 170 and the flexible fingers 164 include mating tapered surfaces that provide the tapered interface. However, it is contemplated that only the flexible forgers 164 or compression member 170 need have the tapered surface.

While not illustrated, a spring member may axially abut the compression member 170 to bias the compression member 170 axially into the flexible fingers 164. The tapered interface converting the load provided by the spring member into the radial force.

In this embodiment, both the flexible fingers 164 and the compression member have a conical surface. These surfaces are mating and help assist the sliding interface between the two components. In this configuration, either or both of the tapered surfaces can be considered to provide the contact zone.

The compression member 170, in this embodiment, includes a base region 172 and a tapered region 174 that provides the tapered surface. The tapered surface extending obliquely relative to axis 124.

The compression arrangement 168 provides for fine adjustment. In this embodiment, a threaded adjustment member 176 is carried for axial movement along axis 124. As the threaded adjustment member 176 is axially translated along axis 124 relative to drive nut 160, the adjustment member 176 translates the compression member 170 relative to flexible fingers 164 to adjust the radial positioning of the flexible fingers 164 and to adjust the engagement with the screw 112.

The base region 172 is axially offset from the drive nut 160 while the tapered region 174 overlaps and axially receives the distal end of the flexible fingers. The adjustment member 176 axially abuts an end of the base region 172 opposite the tapered region 174.

A carrier member 178 carries the adjustment member 176. A threaded engagement between the carrier member 178 and the adjustment member 176 allows for the adjustment in the axial translation of the adjustment member 176 along axis 124. In this embodiment, the carrier member 178 is threadedly attached to the rotor shaft 112. In use, a user can adjust the engagement between the screw 110 and the drive nut 160 by adjusting the position of the adjustment member 176 relative to the carrier member 178.

For alignment, an annular axially extending flange extends axially from the base region 172. A free end of the adjustment member 176 is axially received into the recess defined by the annular projection.

In the illustrated embodiment, the rotor shaft 112 is a hollow shaft and the drive nut and adjustment member are located within the internal cavity of the rotor shaft 112.

A sleeve 182 is located radially between an inner periphery of the rotor shaft 112 and an outer periphery of the flexible fingers 164. The flexible fingers 164 and compression member 170 are located within the sleeve.

The sleeve 182 is axially located between a radially extending abutment 184 provided by the drive nut 160 and a radially inward extending flange portion 186 of the carrier member 178.

Sleeve 182 also provides radial support for the drive nut 164 to prevent displacement of the nut fingers 164 transverse to axis 124 due to loading provided by screw 110.

The interface between the drive nut 160 and the rotor shaft 112 provides a further source of potential backlash. More particularly, the angular coupling between the drive nut 160 and rotor shaft 112 provides a source of potential back lash. This particularly true when the two components are mechanically angularly fixed, e.g. not welded or adhesively attached to one another.

Figure 3:
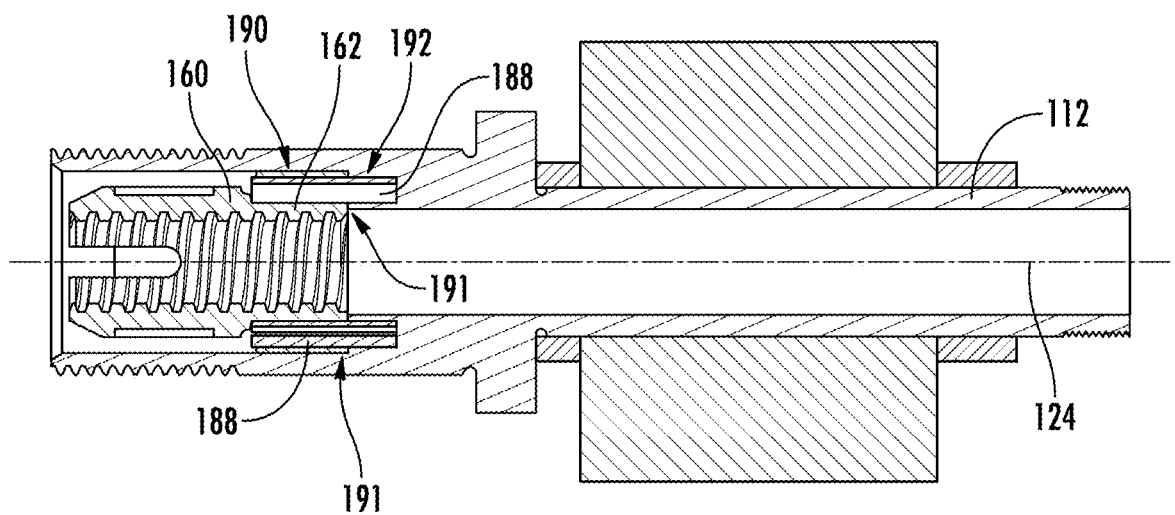
FIGS. 3-21 illustrate various mechanical connections between a drive nut and rotor shaft.
Figure 4:
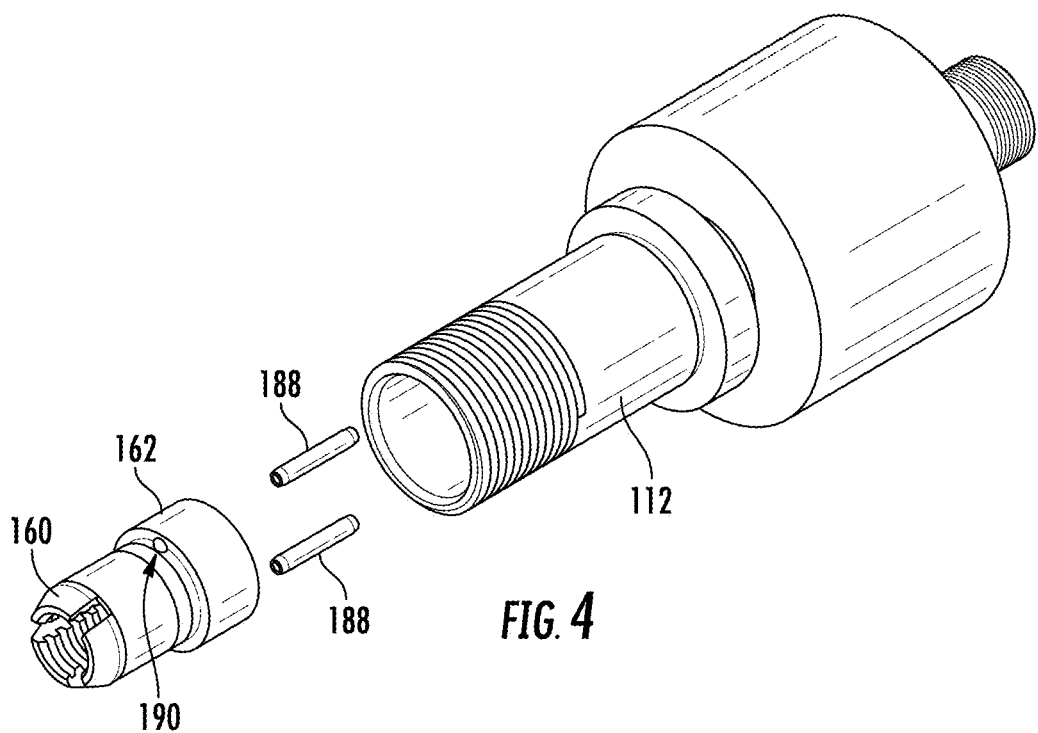

FIGS. 3 and 4 provide a first embodiment of a mechanical engagement between the two components that utilizes axially oriented pins 188 for angularly engaging the drive nut 160 and rotor shaft 112. The pins prevent angular displacement between the rotor shaft 112 and the nut 160.

In this embodiment, the base region 162 of the nut 160 includes a pair of recesses 190 in which a first portion of pins 188 axially extends parallel to axis 124. The rotor shaft 112 includes a pair of recesses 190 in which a second portion of pins axially extends. Recesses 192 are formed in an axially facing surface provided by a radially stepped region 191 of the internal cavity of the rotor shaft 112.

Preferably, the drive nut 160 is axially abutted against the axially facing surface of the stepped region 191.

The pins 188 are sized preferably slightly larger in diameter than the inner diameter than the recesses 190, 192 to provide improved coupling to reduce backlash between the components when changing rotational directions of the rotor 112. The pin 188 could be in the form of a roll pin.

Figure 5:
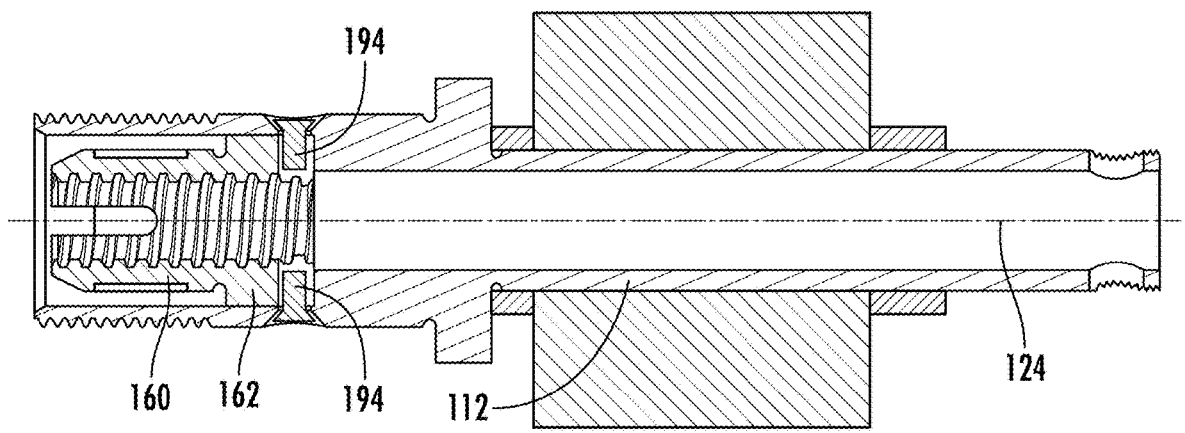
Figure 6:
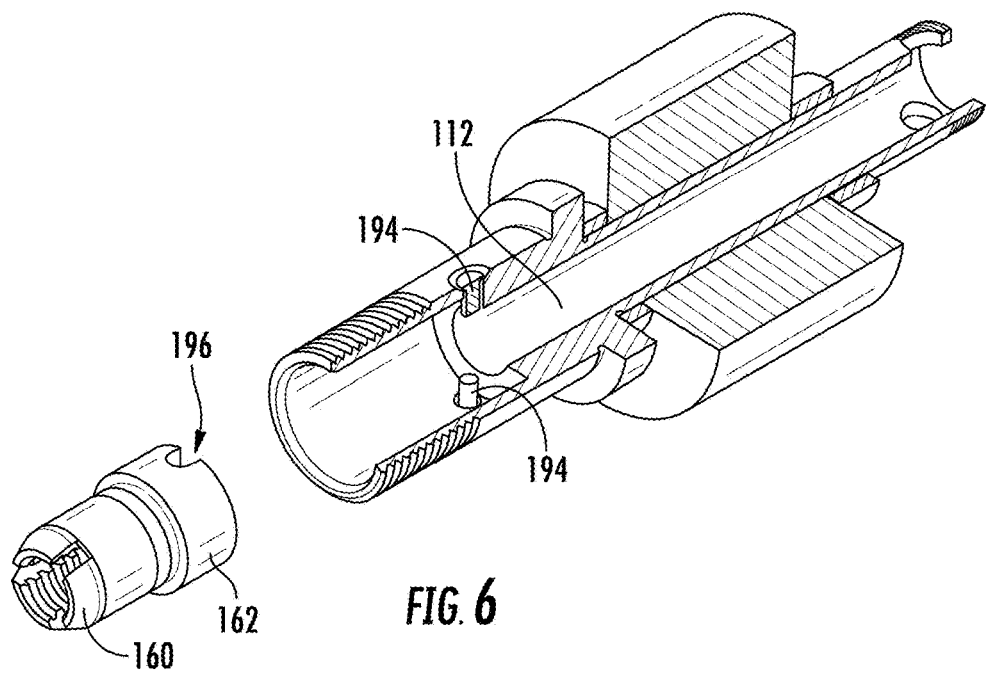

FIGS. 5 and 6 illustrate a further mechanical engagement between the rotor shaft 112 and drive nut 160. In this embodiment, pins 194 extend radially relative to axis 124. The pins 194 extend through apertures formed in a sidewall of the rotor shaft 112 and into recesses 196 formed in the base region 162 of the drive nut. In this embodiment, the recesses are C-shaped and have an open end, also referred to as a mouth, proximate an end of the drive nut, and particularly an end of the base region 162.

In this embodiment, an axial securement mechanism will be required to secure the drive nut 160 axially within the rotor shaft 112. Such a mechanism could be similar to the sleeve 182 and carrier member 178 discussed above. However, the carrier member 178 in that embodiment need not carry, but could carry, an adjustment member 176.

The pin 194 includes an enlarged head region and a narrower shaft portion. Preferably, the head region of the pin is recessed radially into the outer periphery of the rotor shaft 112.

The width of the recess, e.g. substantially in the angular direction, is closely matched to the width of the shaft portion of the pin to reduce any angular backlash between the components.

In additional embodiments, the drive nut base 162 includes a non-round outer periphery that cooperates with a corresponding non-round inner periphery of the rotor shaft 112 that defines the internal cavity of the rotor shaft 112. The inner periphery of the rotor shaft 112 that receives the drive nut 160 may form a socket. The cooperating non-round peripheries engage to transfer angular motion for the rotor shaft 112 to the drive nut 160.

It is noted that the non-round periphery relationships could incorporate pin configurations described above.

Figure 7:
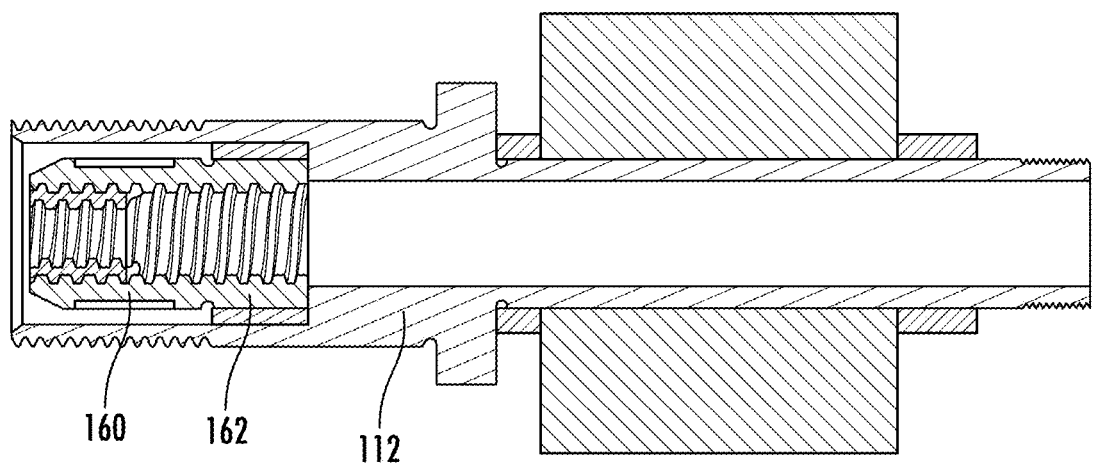
Figure 8:
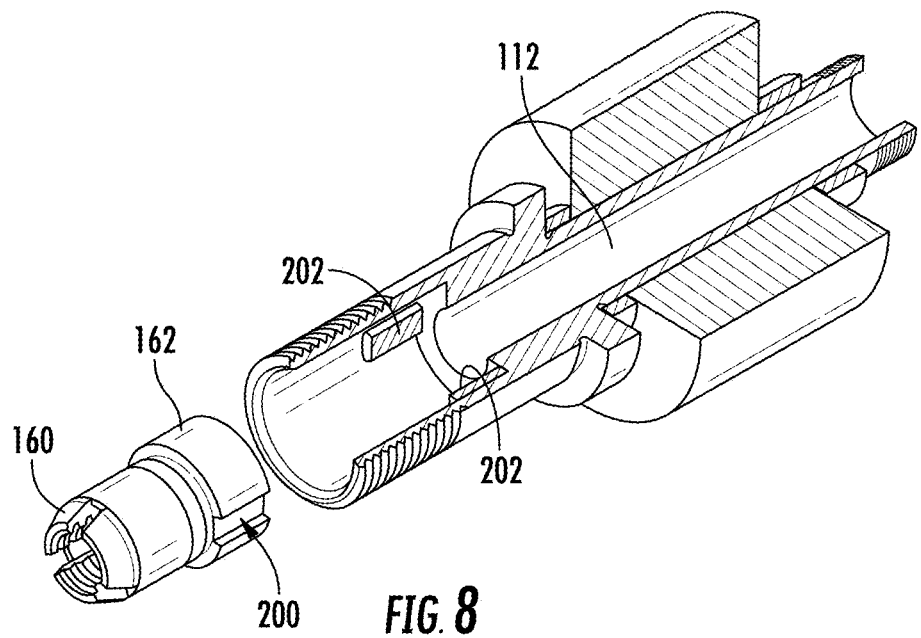

FIGS. 7 and 8 illustrate an embodiment that includes the cooperating non-round peripheries.

In this embodiment, the drive nut 160 includes a pair of radial slots 200 in an outer periphery thereof. The slots 200 are formed by opposed sidewalls with a bottom extending therebetween. The bottom may be flat or curved. These slots are optionally formed in the base region 162.

The slots 200 cooperate with and angularly engage antirotation tangs 202 machined into the internal periphery of the rotor shaft 112. The sidewalls of the slots 200 will angularly engage sidewalls of the tangs 202. Further, if the bottom of the slots 200 and the radially inner most surface of the tangs are flat, additional anti-rotation is provided by the interface between the tangs 202 and slots 200.

Figure 9:
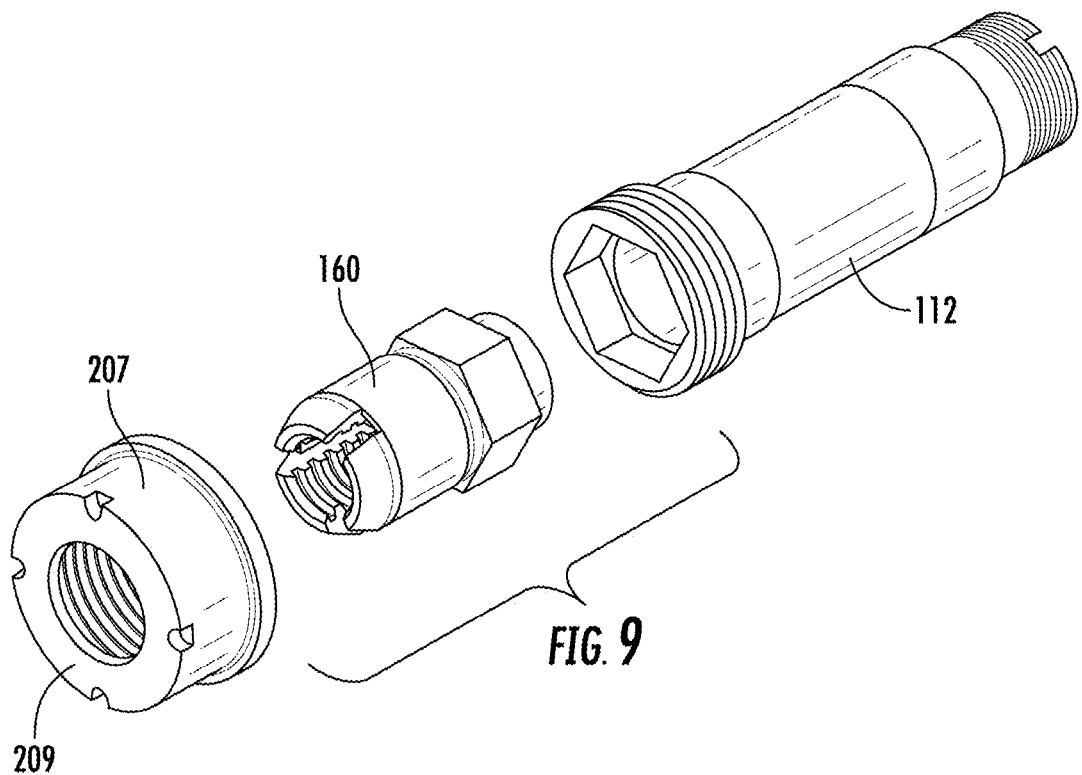
Figure 10:
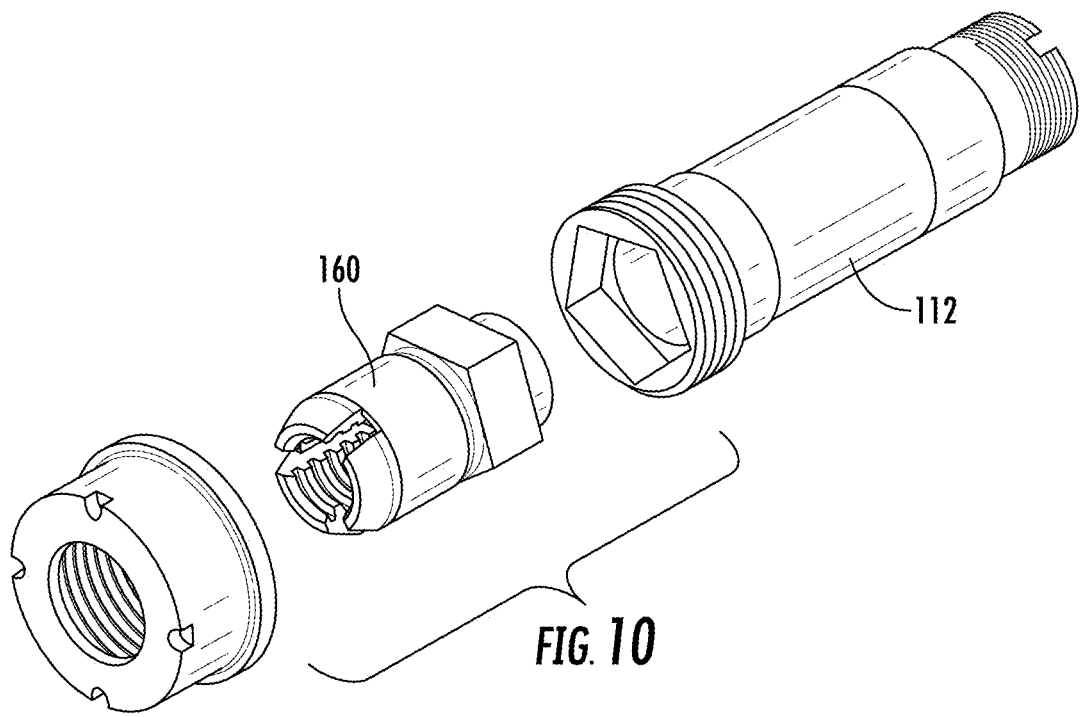

FIGS. 9 and 10 illustrate a further non-round periphery configuration. This design does not include slots like in the prior embodiment. In this embodiment, the cooperating non-round peripheries are hex-shaped. The flat surfaces of the non-round peripheries mate angularly coupling the rotor shaft 112 with the drive nut 160.

This embodiment also illustrates a retainer 207 that can be threadedly attached to the rotor shaft 112 for axially securing, at least a portion of, the drive nut 160 within the internal cavity of the rotor shaft 112. The retainer 207 is similar in many respects to carrier member 178 discussed above. The retainer 207 includes a radially inward extending end wall that axially abuts a corresponding abutment of the drive nut 160. This abutment of the drive nut could be provided by the hex shaped periphery or another stepped region of the drive nut 160.

Figure 11:
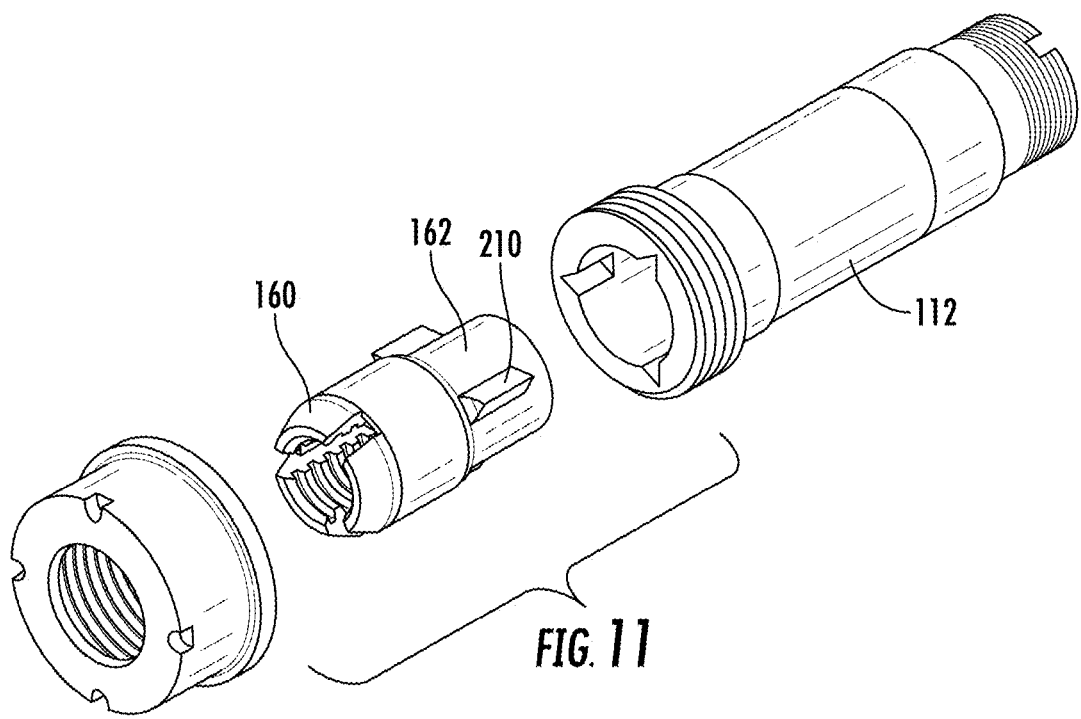

FIG. 11 illustrates an embodiment that includes triangular shaped projections 210 that extend from a round base region 162.

Figure 12:
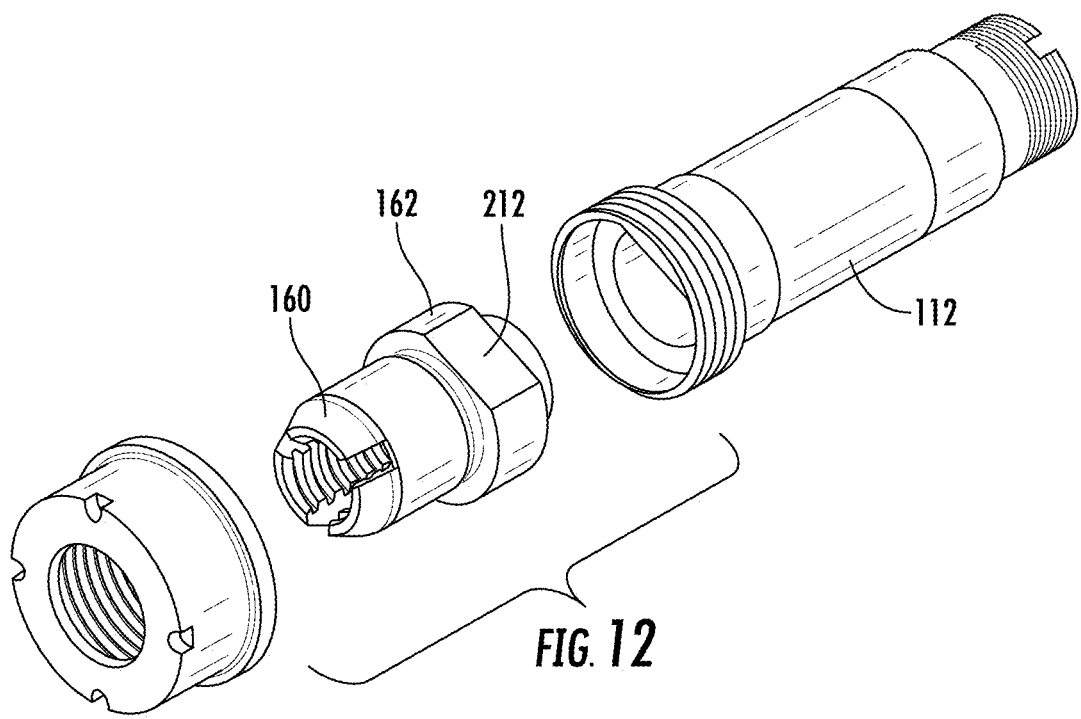

FIG. 12 illustrates an embodiment that is D-shaped. The D-shaped is provided by forming a flat 212 in the round periphery of the drive nut 160. This flat 212 is formed in the base region of the drive nut 160.

Figure 13:
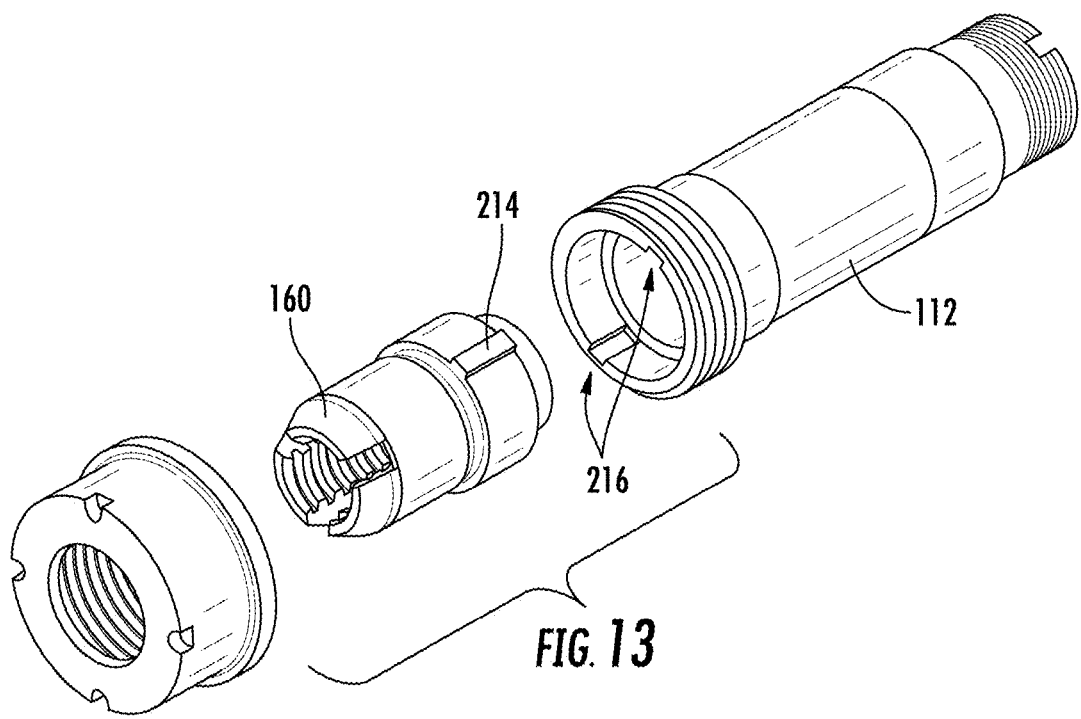

FIG. 13 illustrates the use of one or more keys 214 extending radially from the base region 162 of the drive nut 160. The rotor shaft 112 has corresponding keyways 216 formed therein.

Figure 14:
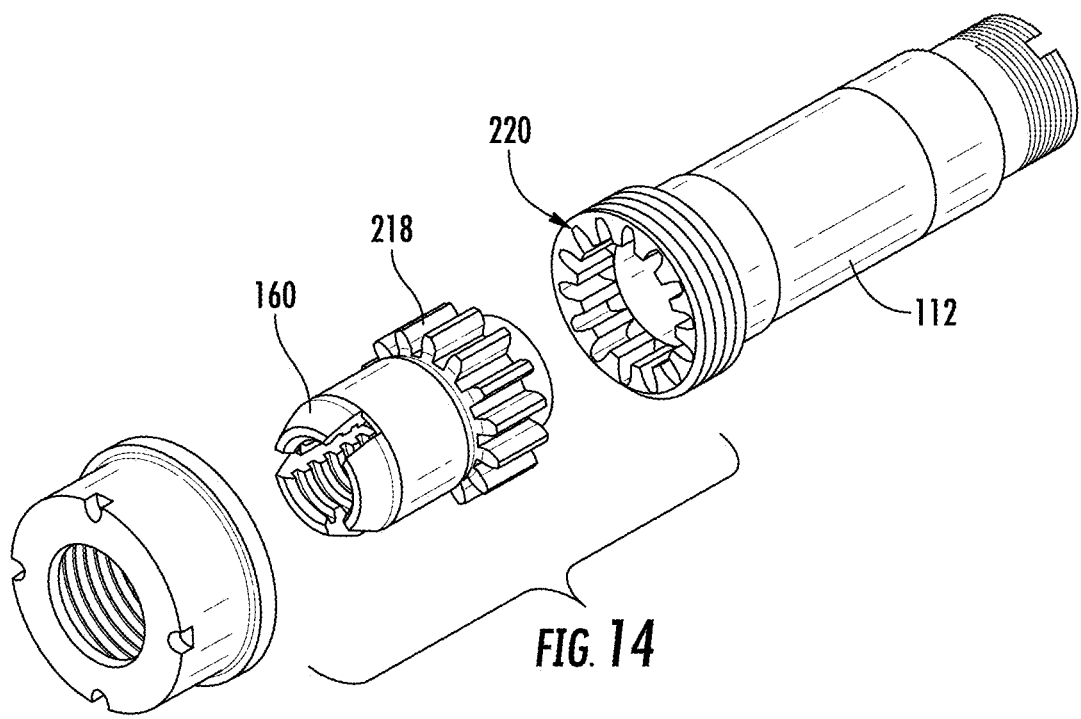

FIG. 14 illustrates gear shaped projections 218 that cooperate with similarly shaped grooves 220 formed in the rotor shaft 112.

Figure 15:
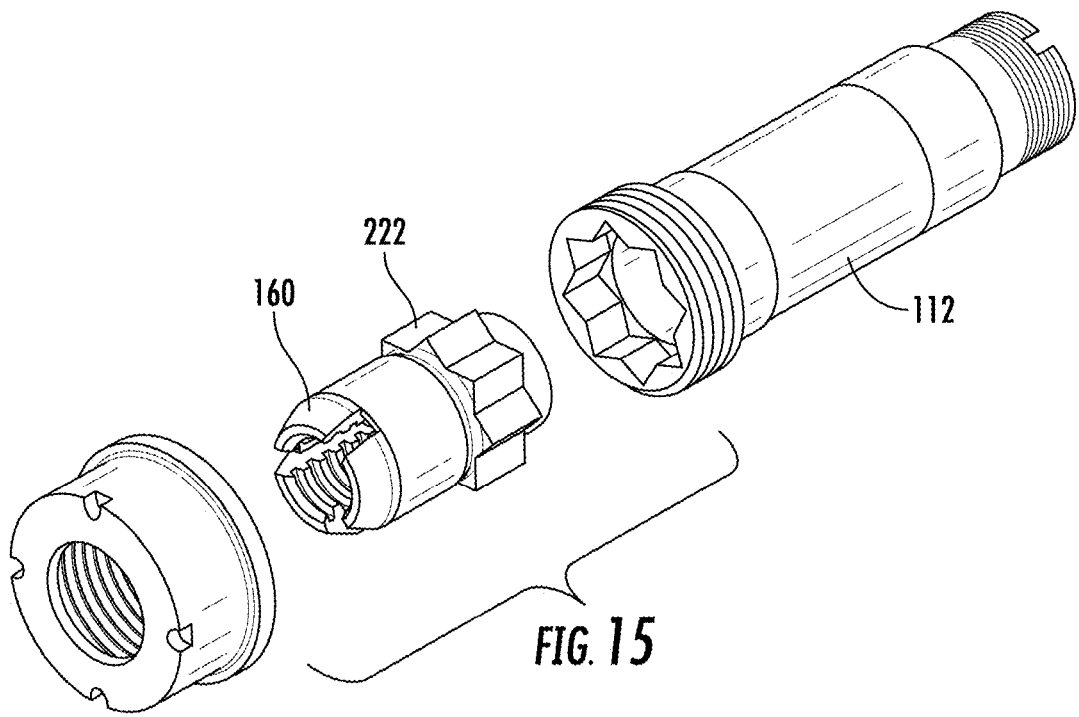

FIG. 15 illustrates an embodiment that utilizes a double square shaped profile. Here, there are 8 projections 222 that form corners of a pair of angularly offset squares, e.g. the sides of the projections extend at 90 degrees relative to one another.

Figure 16:
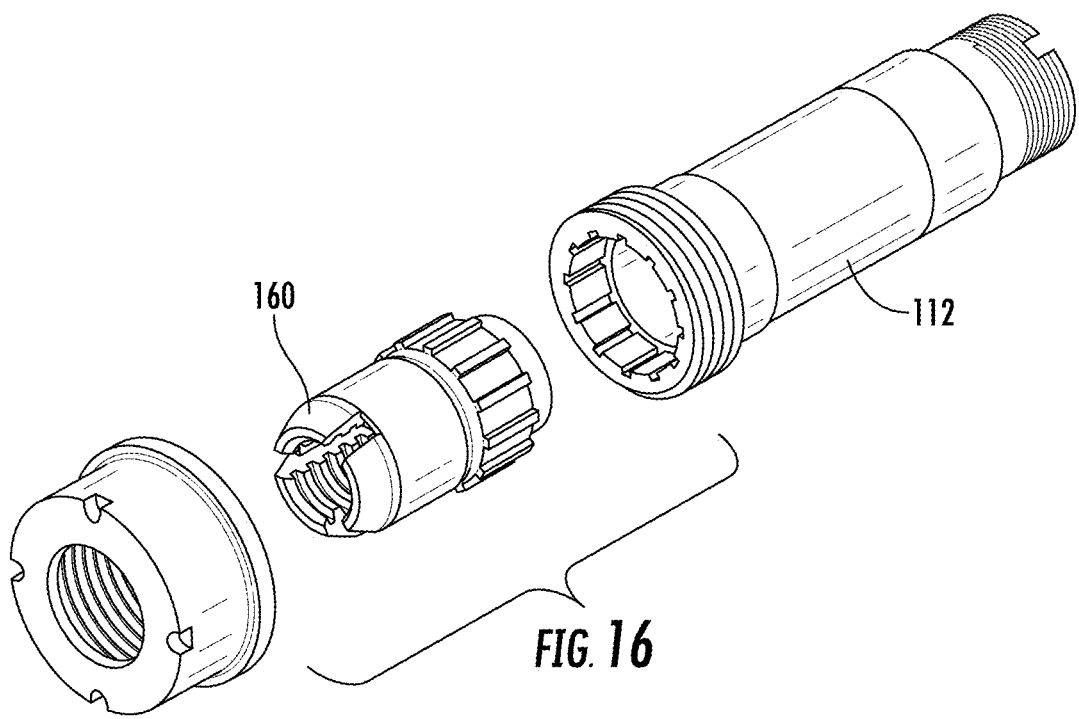

FIG. 16 illustrates an embodiment that utilizes a splined periphery. The splined periphery utilizes a plurality of radial projections angularly spaced around the drive nut 160. Here, more than 10 projections are provided but more or less than 10 are contemplated.

Figure 17:
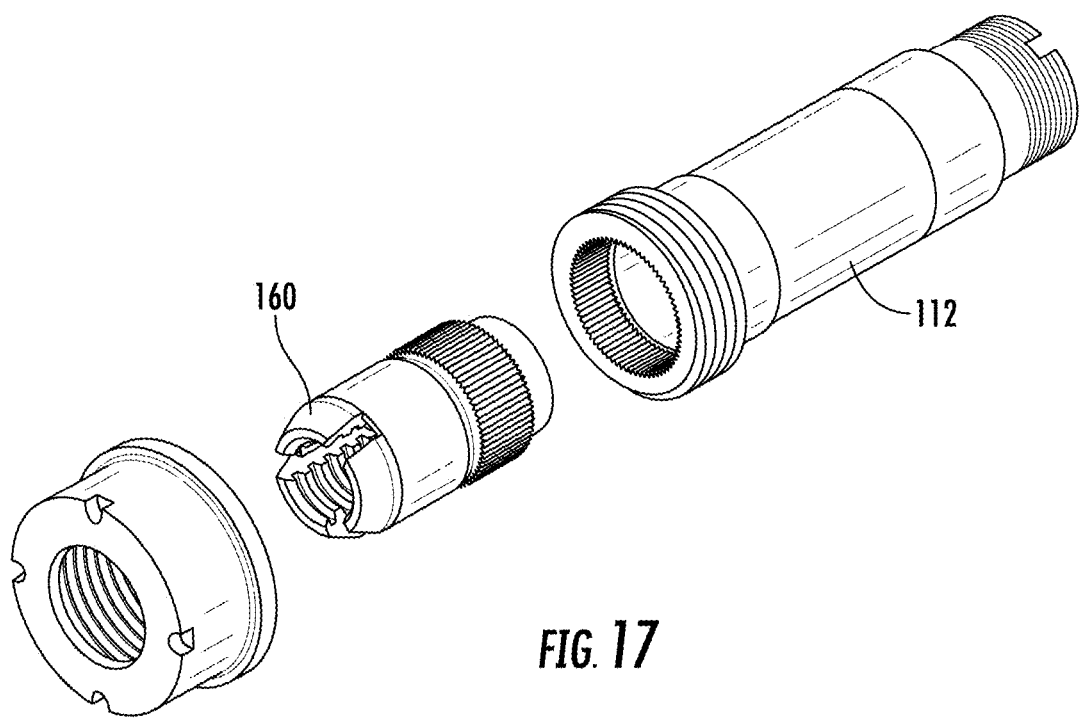

FIG. 17 illustrates a knurled peripheral shape.

Figure 18:
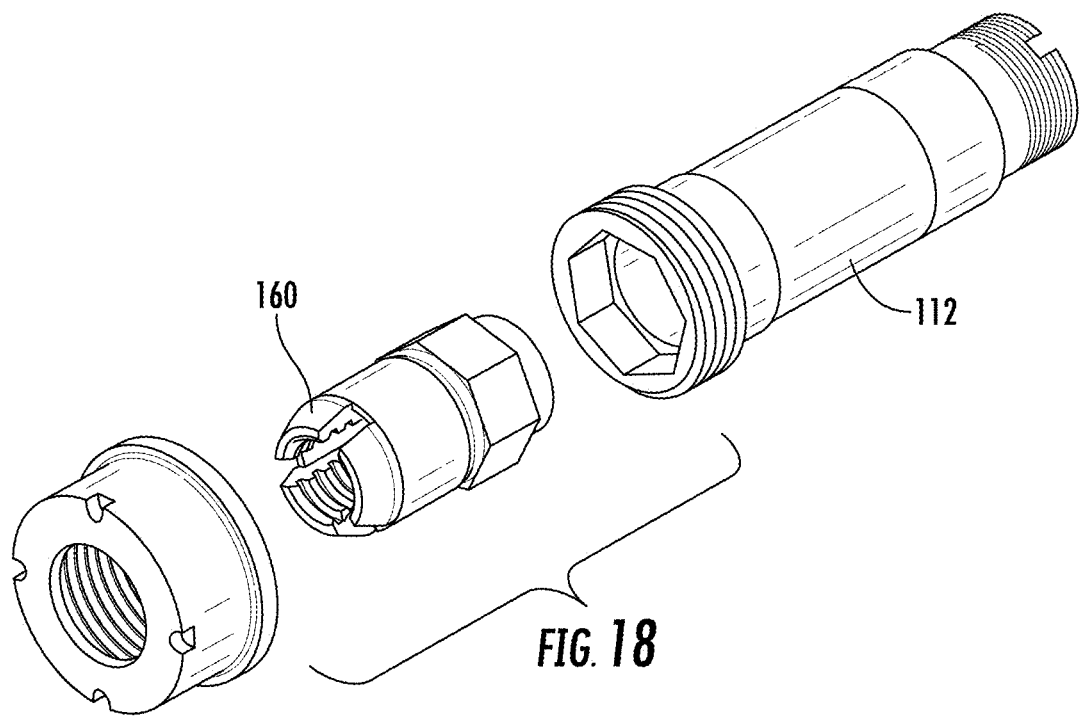

FIG. 18 illustrates a heptagonal peripheral shape.

Figure 19:
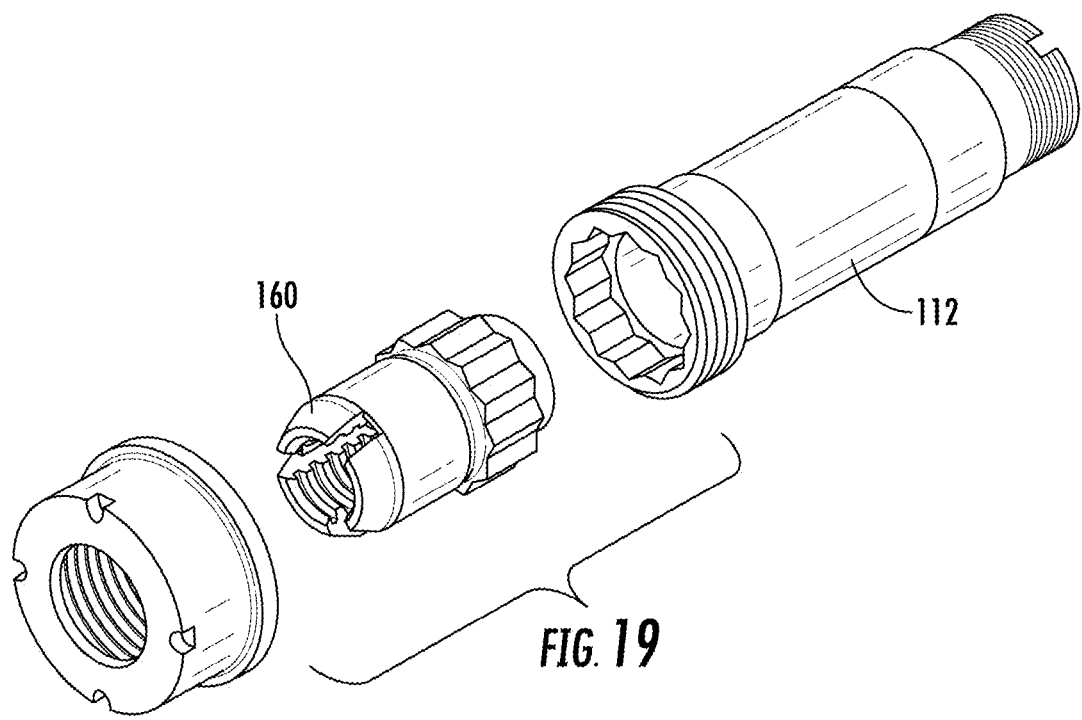

FIG. 19 illustrates a double hex peripheral shape.

Figure 20:
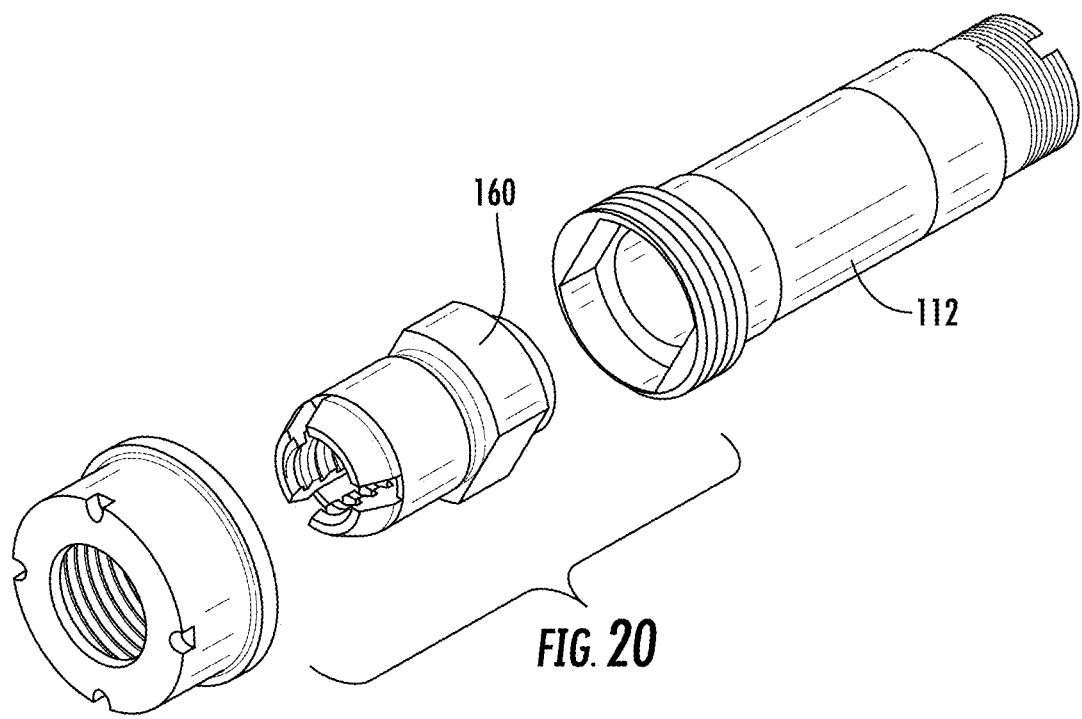

FIG. 20 illustrates a double D peripheral shape. The double D has flats on opposite sides of the base region of the drive nut 160 that face radially away from one another.

Figure 21:
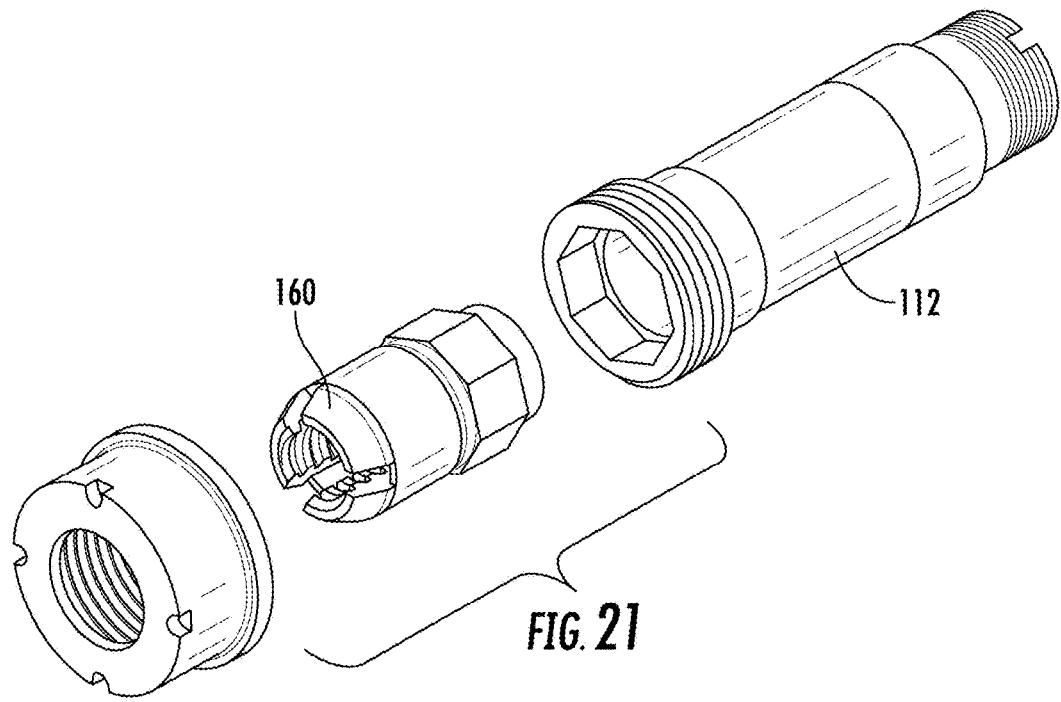

FIG. 21 illustrates an octagonal peripheral shape.

Figure 22:
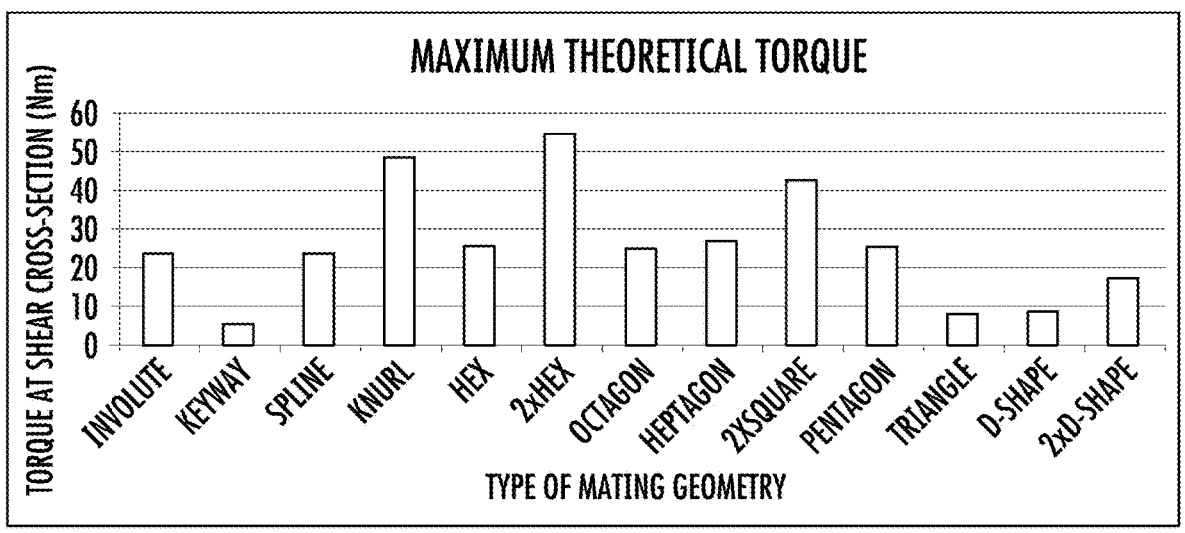
FIG. 22 is a chart showing theoretical torque values for different ones of the mechanical connections.

The various designs provide different peripheral shapes provide varying levels of theoretical torque for a substantially same sized interface. FIG. 22 provides a chart that illustrates potential different maximum torque values for the different mating peripheries.

Figure 23:
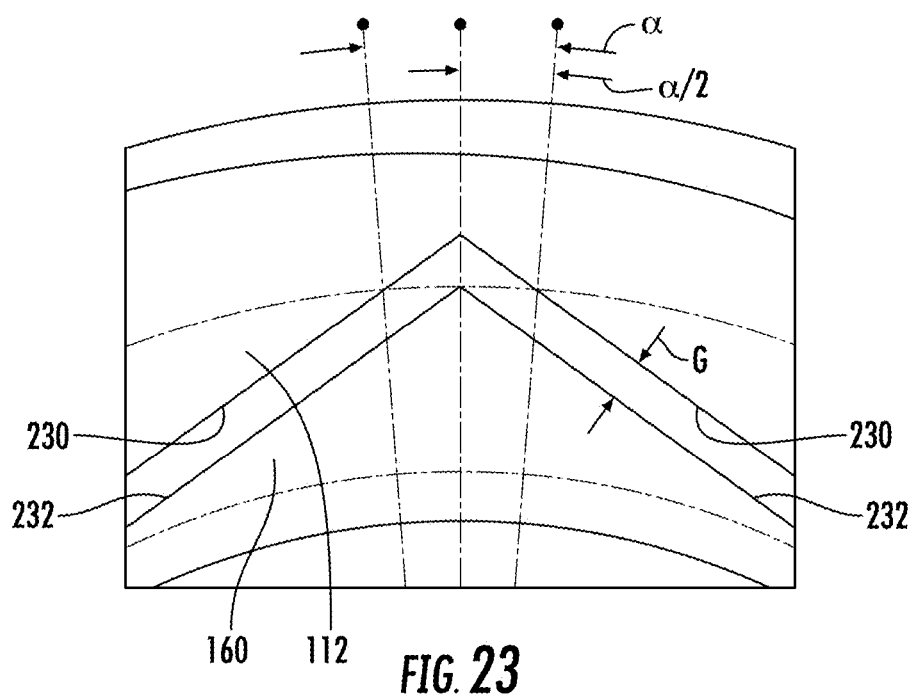
FIG. 23 is a diagram illustrating the interface between the mechanical connections related to non-round peripheries and potential angular displacement based on a given gap between mating surfaces.

FIG. 23 is a cross-section illustrating a theoretical gap formed between flats of the various designs discussed above. Here, the gap G is defined as being the spacing between the flats 230 of the rotor shaft 112 and the corresponding flats 232 of the drive nut 160. The amount of angular displacement α that may occur between the drive nut 160 and rotor shaft 112 is dependent on this gap G as well as the shape of the peripheries.

The angular displacement α relates to the theoretical amount of angular displacement that the tip 236 between adjacent flats of an outer periphery may move angularly between adjacent flats 230 of the inner periphery about axis.

Figure 24:
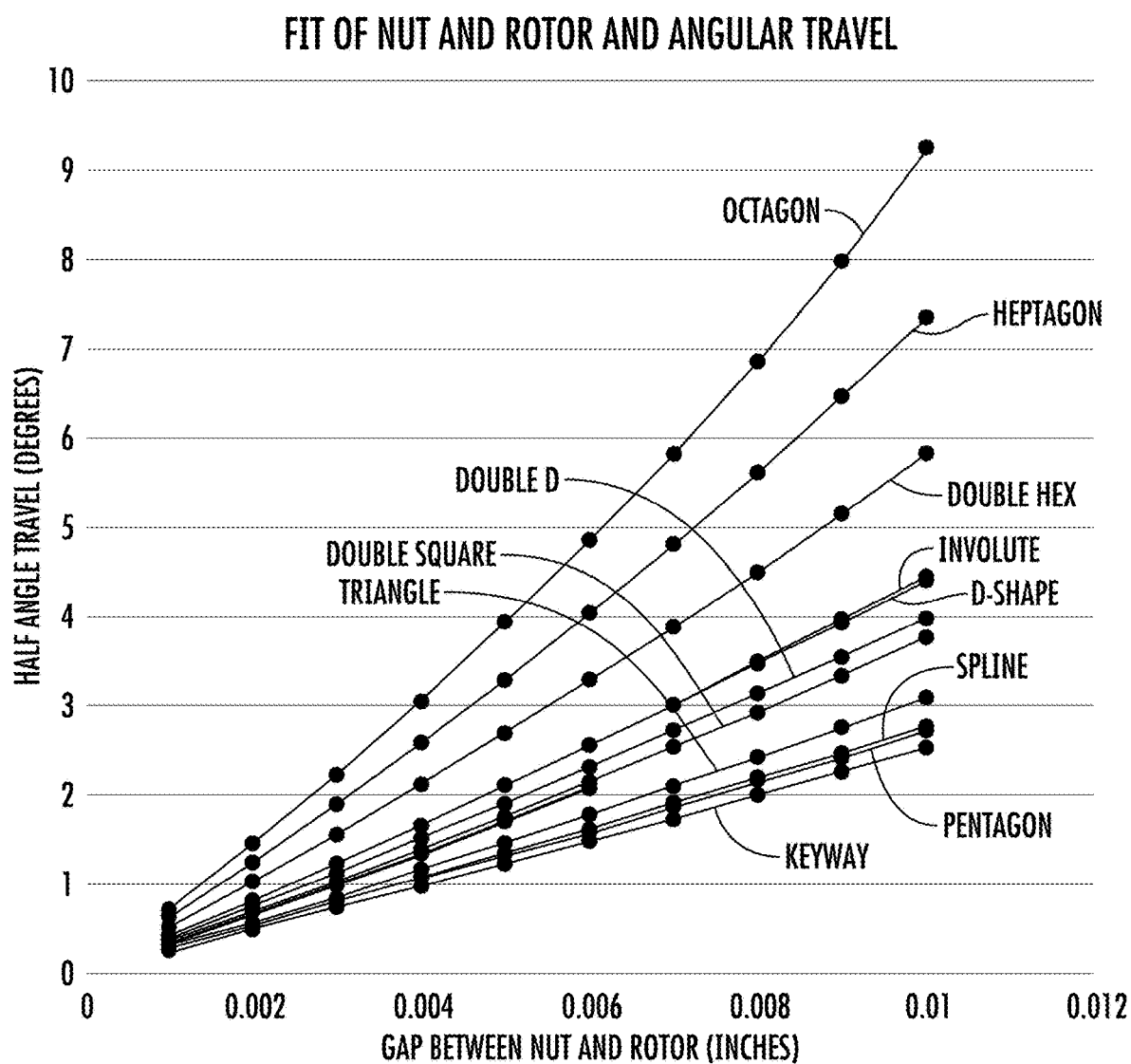
FIG. 24 is a chart based on varying gaps between mating surfaces of different non-round periphery connections.

The tables in FIGS. 25-36 provide theoretical angular displacement α values for different amounts of gap G for various ones of the peripheral shapes discussed above. FIG. 24 is a graph showing these values.

Figure 37:
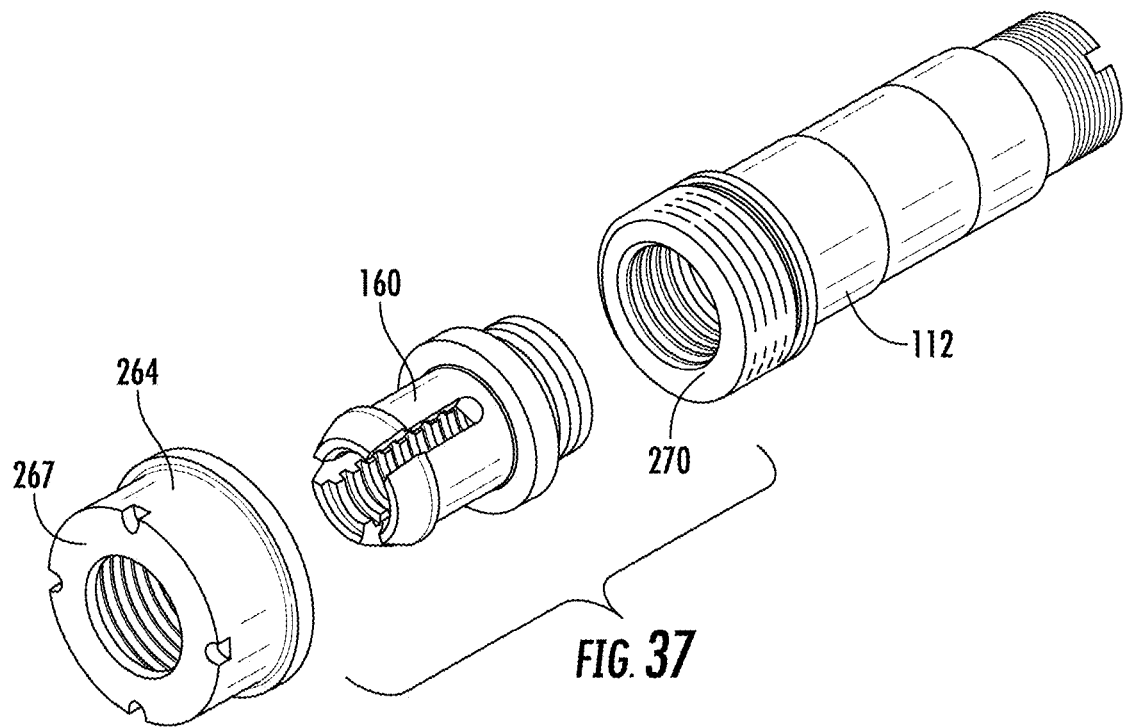
FIGS. 37 and 38 further illustrate a mechanical connection between a rotor shaft and drive nut that utilizes oppositely oriented threaded interfaces.
Figure 38:
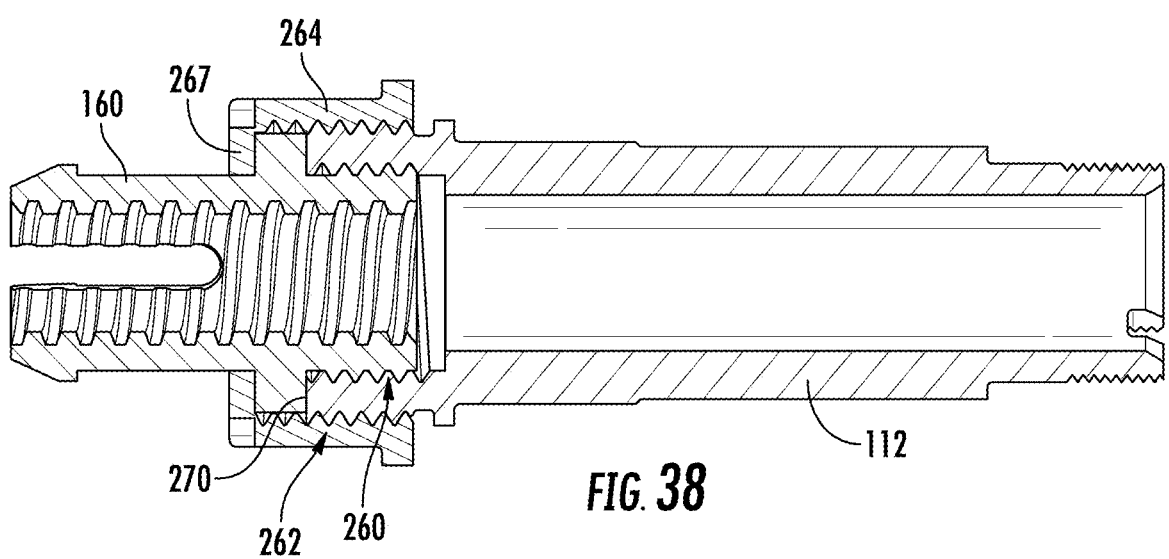

With reference to FIGS. 1 and 37-38, a further mechanical connection between the drive nut 160 and the rotor shaft 112 is illustrated. In this embodiment, a pair of oppositely threaded interfaces 260, 262 are provided to angularly and axially secure the drive nut 160 to the rotor shaft.

The first threaded interface 260 is provided between the drive nut 160 and the rotor shaft 112. This threaded interface 260 has a first orientation (e.g. is either right handed or left handed).

The second threaded interface 262 is provided between a retainer 264 and the rotor shaft 112. This threaded interface 262 has a second orientation that is opposite of the first threaded interface 260 (e.g. is left hand or right handed). More particularly, if the first threaded interface 260 is right handed, then the second threaded interface would be left handed. If the first threaded interface 260 is left handed, then the second threaded interface would be right handed.

The retainer 264 has a radially inward extending flange 267 that acts axially against an axial abutment 268 of the drive nut 160 which acts axially against an axial abutment of the rotor shaft 112. In this embodiment, the axial abutment of the rotor shaft 112 is simply the free end 270 of the rotor shaft. As such, regardless of the direction of rotation of the motor, the drive nut 160 is axially fixed relative to the rotor shaft 112 because it is prevent from rotating relative to the rotor shaft 112.

A further problem identified with motors such as those of the illustrated embodiments where the screw 110 extend through a hollow shaft is that the free end of the screw that is located within the internal cavity of the rotor shaft 112 may bend or not be perfectly oriented along axis 124. This can occur as a result of, among other things, potential flexing of the drive nut 160 as a result of incorrect mounting of the motor 100 or due to radial loading of the screw 110. This can also occur due to whipping of the screw 110.

This bending or whipping action can provide a source backlash. This can also cause the screw 110 to contact the inner surface of the rotor shaft 112 which can damage the threads of the screw 110.

FIG. 1 also illustrates the inclusion of a stabilizer 240 (also referred to as a lead screw support) attached to an end of the rotor shaft 112 opposite the end at which the drive nut 160 is attached. In this embodiment, the stabilizer is threadedly attached to the rotor shaft 112, but it could be attached in other manners.

The stabilizer 240 includes an aperture 242 through which an end of the screw 110 can extend when retracted sufficiently far into motor 100. The stabilizer is formed from a softer material than the rotor shaft 112 and a softer material than the screw 110. The diameter of the aperture 242 is sized such that the screw 110 will radially contact the portion of the stabilizer defining aperture 242 prior to making contact with the inner surface of the rotor shaft. Thus, the screw 110 will radially support the screw when the problems outlined above occur rather than the inner surface of the rotor shaft 112.

By being provided as a softer material, the stabilizer 240 will not damage the threads of the screw 110. Depending on the implementation, the stabilizer 240 could be a polymer material or brass. However, other materials are contemplated.

In this embodiment, the aperture 242 is provided by a radially inward extending end wall 244 of the stabilizer 240.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A rotor assembly for a motor, the rotor assembly comprising:
   a rotor shaft defining a rotor shaft axis, the rotor shaft providing a first axial abutment;
   first and second bearings radially supporting the rotor shaft, an outboard side of the first bearing axially abutting the first axial abutment;
   a magnetic core having a first end and a second end mounted between the first and second bearings;
   a first standoff axially abutting an inboard side of the first bearing and axially abutting the first end of the magnetic core;
   a second standoff axially abutting an inboard side of the second bearing and the second of the magnetic core; and
   a shaft retainer attached to the rotor shaft and axially abutting the outboard side of the second bearing.

2. The rotor assembly of claim 1, wherein the shaft retainer is threadedly attached to threading provided on an outer surface of the rotor shaft.

3. The rotor assembly of claim 1, wherein:
   the first and second bearings have radially inner and outer races;
   the first standoff axially abuts the inner race of the first bearing;
   the second standoff axially abuts the inner race of the second bearing;
   the inner race of the first bearing axially abuts the first axial abutment; and
   the shaft retainer axially abuts the inner race of the second bearing.

4. A motor comprising:
   a rotor assembly of claim 1;
   a motor body with the rotor assembly mounted within the motor body, the first and second bearings radially supporting the rotor assembly within the motor body, the motor body providing a first motor body axial abutment, the outboard side of the first bearing axially abutting the first motor body axial abutment; and
   a rotor assembly retainer axially abutting the outboard side of the second bearing and engaging the motor body.

5. The motor of claim 4, wherein:
   the first and second bearings have inner and outer races;
   the first standoff axially abuts the inner race of the first bearing;
   the second standoff axially abuts the inner race of the second bearing;
   the inner race of the first bearing axially abuts the first axial abutment;
   the shaft retainer axially abuts the inner race of the second bearing;
   the outer race of the first bearing axially abuts the first motor body axial abutment; and
   the rotor assembly retainer axially abuts the outer race of the second bearing.

6. The motor of claim 5, wherein the rotor assembly retainer is threadedly secured to the motor body for axially threading the rotor assembly retainer along the rotor shaft axis.

7. The motor of claim 5, wherein the rotor assembly retainer is provided by a threaded retainer and a preload member, the preload member positioned axially between and in axial abutment with the outer race of the second bearing and the threaded retainer, the threaded retainer threadedly secured to the motor body.

8. The motor of claim 4, wherein the shaft retainer is threadedly attached to threading provided on an outer surface of the rotor shaft.

9. The motor of claim 7, wherein the preload member is a polymer disc.

10. A method of assembling the motor of claim 4 comprising:
    axially stacking the first bearing, first standoff, magnetic core, second standoff and second bearing on the rotor shaft along the rotor shaft axis against the first axial abutment provided by the rotor shaft;
    securing the first bearing, first standoff, magnetic core, second standoff and second bearing on the rotor shaft with the shaft retainer; and
    inserting the first bearing, first standoff, magnetic core, second standoff, second bearing, rotor shaft and shaft retainer into the motor body with the magnetic core positioned within a magnetic stator and the first bearing axially in axial abutment with the first motor body axial abutment.

11. The method of claim 10, further comprising attaching the rotor assembly retainer to the motor body and axially abutting the rotor assembly retainer against the outboard side of the second bearing.

12. The method of claim 11, wherein attaching the rotor assembly retainer to the motor body includes threading the rotor assembly retainer to corresponding threading of the motor body.

13. The method of claim 10, wherein securing the first bearing, first standoff, magnetic core, second standoff and second bearing on the rotor shaft with the shaft retainer includes threadedly securing the shaft retainer to the rotor shaft along the rotor shaft axis.

14. The method of claim 10, wherein the step of stacking includes press fitting the magnetic core to the rotor shaft such that the magnetic core and rotor shaft are angularly fixed to one another about the rotor shaft axis.

15. The method of claim 10, further comprising adhesively securing the magnetic core to the rotor shaft.

16. The method of claim 10, wherein:
    the first and second bearings have inner and outer races;
    the first standoff axially abuts the inner race of the first bearing;
    the second standoff axially abuts the inner race of the second bearing;
    the inner race of the first bearing axially abuts the first axial abutment;
    the shaft retainer axially abuts the inner race of the second bearing;
    the outer race of the first bearing axially abuts the first motor body axial abutment; and
    the rotor assembly retainer axially abuts the outer race of the second bearing.

17. A motor comprising:
    a motor body;
    a rotor assembly including:
       a rotor shaft defining rotor shaft axis;
       a magnetic core;
       a first bearing;
    a rotor assembly retainer including:
       a retainer member; and a preload member axially positioned between an outboard side of the first bearing and the retainer member, the preload member being a disc having a Shore-A durometer value of between 10 and 80.

18. The motor of claim 17, wherein the preload member is a polymer disc.

19. The motor of claim 17, wherein the retainer member is threadedly engaged with the motor body for axial adjustment along the rotor shaft axis to adjust the axial force applied to the first bearing through the preload member.

20. The motor of claim 18, wherein the first bearing has radial inner and outer races, the preload member axially abutting outboard side of the outer race.

21. A motor comprising:
   a motor body;
   a rotor assembly rotatably carried in the motor body, the rotor assembly including:
      a rotor shaft;
      a magnetic core;
      a first bearing;
   a rotor assembly retainer including:
      a retainer member; and
      a polymer disc axially positioned between an outboard side of the first bearing and the retainer member.

22. The motor of claim 21, wherein the retainer member is threadedly engaged with the motor body for axial adjustment along the rotor shaft axis to adjust the axial force applied to the first bearing through the preload member.

23. The motor of claim 22, wherein the first bearing has radial inner and outer races, the preload member axially abutting outboard side of the outer race.

* * * * *